United States Patent [19]
Thoma, III et al.

[11] Patent Number: 5,253,358
[45] Date of Patent: Oct. 12, 1993

[54] CACHE MEMORY EXPANSION AND TRANSPARENT INTERCONNECTION

[75] Inventors: Roy E. Thoma, III; Joseph P. Miller, both of Houston; Bill Skelton, Cypress; Mark Taylor, Houston; Randy M. Bonella, Cypress, all of Tex.

[73] Assignee: Compaq Computer Corporation, Houston, Tex.

[21] Appl. No.: 883,049

[22] Filed: May 7, 1992

Related U.S. Application Data

[63] Continuation of Ser. No. 354,349, May 19, 1989, abandoned.

[51] Int. Cl.⁵ .................................................. G06F 13/00
[52] U.S. Cl. ................................. 395/500; 395/250; 364/240.3; 364/243.4; 364/964.2
[58] Field of Search ............... 395/200, 425, 725, 250, 395/500; 364/DIG. 1, DIG. 2

[56] References Cited

U.S. PATENT DOCUMENTS

| | | | |
|---|---|---|---|
| 4,237,543 | 12/1980 | Nishio | 364/900 |
| 4,271,466 | 6/1981 | Yamamoto | 364/200 |
| 4,442,487 | 4/1984 | Fletcher | 364/200 |
| 4,447,878 | 5/1984 | Kinnie | 364/200 |
| 4,853,846 | 8/1989 | Johnson et al. | 364/200 |

FOREIGN PATENT DOCUMENTS

| | | |
|---|---|---|
| 0149451 | 7/1985 | European Pat. Off. |
| 0309995 | 4/1989 | European Pat. Off. |

OTHER PUBLICATIONS

S. Domen, Tech Bits: A 64-Kbyte Solution for the 82385, No. 82385-PFG, Intel Corp. (Jun. 16, 1988).
Intel Corp., 1 Microprocessor and Peripheral Handbook: Microprocessor 4-287 to 4-332 (1988).

*Primary Examiner*—David Y. Eng
*Attorney, Agent, or Firm*—Pravel, Hewitt, Kimball & Krieger

[57] ABSTRACT

A 64 bit wide memory is multiplexed over a 32 bit data bus to provide data to a 64 bit line size cache memory controlled by an 82385 cache controller. The memory addresses to all 64 bits of memory are held during the entire transfer so that a zero wait state second 32 bit transfer occurs. Logic develops the necessary next address and ready pulses and blocks these signals from the cache controller. Logic also handles the bit 2 address for the main and cache memories. The main memory is operated in paged mode to further increase system performance.

14 Claims, 14 Drawing Sheets

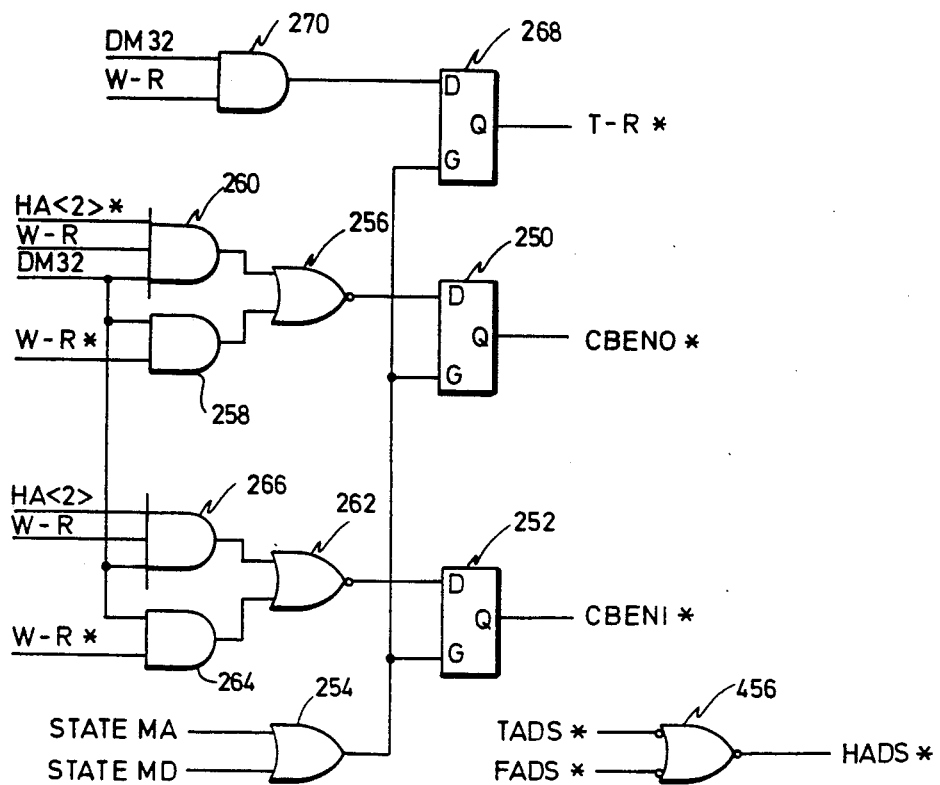
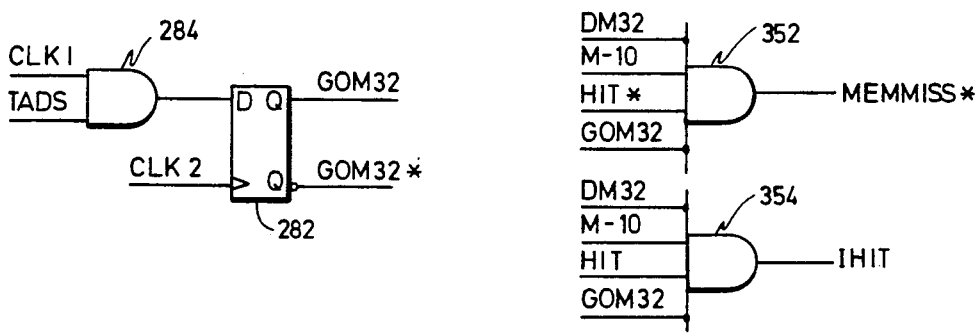
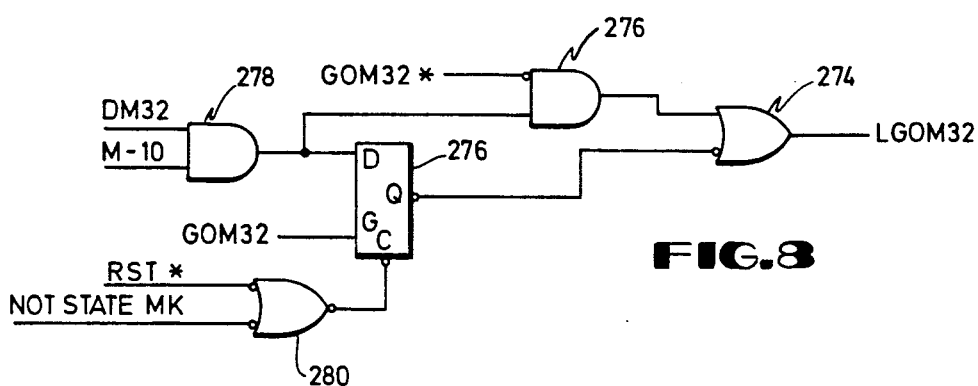
FIG.8

CACHE MEMORY EXPANSION AND TRANSPARENT INTERCONNECTION

This is a continuation of co-pending application Ser. No. 354,349 filed on May 19, 1989 now abandoned.

BACKGROUND OF THE INVENTION

1. Field of the Invention

The invention relates to memory systems used in computers, and more particularly to memory systems using cache memory.

2. Discussion of the Related Art

Personal computer systems are becoming more powerful quite rapidly. Device manufacturers have been providing ever faster microprocessors for use in the computers. However, memory device speeds have not been increasing as fast as the microprocessors with which they are used. Fast memory devices are available, but their use as the main memory of the computer is generally prohibited because of their high cost.

One approach to solving the problem is to use a cache memory system. In a cache memory system a small amount of fast memory is used and slower, more cost effective memory is used as the main memory. Data contained in portions of the main memory is duplicated in the fast, cache memory so that when the necessary data is contained in the cache memory a fast operation can occur. A cache controller handles the task of determining if the desired information is contained in the cache memory and controlling the data transfer and the cache memory devices.

Intel Corporation (Intel) used the cache memory concept when developing the 80386 microprocessor family of devices. In addition to the 80386 microprocessor, an 82385 cache controller was developed. For detailed information on the devices please refer to handbooks provided by Intel, such as the Microprocessor and Peripheral Handbook, Volume 1. The 82385 is designed to directly control a 32 kbyte cache memory organized as either a direct mapped 8 k by 4 byte block or two 4 k by 4 byte blocks in a two way set associate configuration. In either format the 82385 assumes that the memory width, referred to in this case as the line size, is 4 bytes, a double word or dword.

However, a larger cache memory in many cases improves performance of the computer by improving the number of times the desired information is found to be in the cache, referred to as the hit rate. Thus the 32 kbyte limit imposed by the 82385 may have limited ultimate system performance.

The Model 70-A21 computer in the Personal System/2 line manufactured by International Business Machines Corporation (IBM) utilized the 82385 and yet had a 64 kbyte cache memory.

Intel provided an application note describing in general terms a method for using a 64 kbyte cache memory with the 82385. The basic approach required doubling the line size to 64 bits, a quadruple word or qword. Various address lines connected to the 82385 were shifted and external logic was required to perform a number of functions. The external logic had to drive one bit of the addressing to the cache memory to select the proper dword, this function no longer capable of being performed by the 82385, which only selected the proper qword. The external logic was required to control the write enables to the cache memory. The external logic had to monitor various lines to determine cache activity and when a miss occurred. The external logic had to capture and develop various cycle related signals such as Next Address (NA), Ready and Address Status (ADS).

During a cache read hit operation the external logic had only to complete the addressing of the cache memory. Similarly for a cache write hit, the external logic had only to complete the addressing. Cache write miss operations were unaffected as the cache memory was not involved.

Cache read miss operations were more complex. The external logic had the duty to provide the two dwords to the cache memory to fill the cache but had to make this operation appear as only a single operation to the 82385. When utilizing a 32 bit data bus, the external logic was required to drive the proper addresses onto the address bus, provide an additional ADS strobe and block any extra NA or READY signals to the 82385 to prevent it from proceeding. It was suggested that the dword undesired by the 80386 be obtained first and the dword desired by the 80386 obtained second.

Problems developed because the cache fill operation is not zero-based, that is, the least significant address bit could be one or zero, and yet the transfer had to be completed correctly. Additionally, the cache fill had to be done quickly or the fill time increase would offset any hit rate increases and could actually degrade system performance. A 64 bit wide memory path could be utilized between the cache memory and the main memory, but this would requiring 64 data lines which uses valuable circuit board space and increases radio frequency emissions to levels requiring expensive solutions to meet desired levels.

An alternative to using a cache memory system to increase cost effective system performance was to use a paged memory. Certain dynamic random access memory (DRAM) devices were available which allowed faster access under certain conditions. Conventionally in a DRAM the address inputs are multiplexed to reduce the physical size of the device page. One half of the address values were provided, called the row address, and then the remaining address values are provided, the column address. Thus, to obtain data both the row and the column addresses had to be provided and set up inside the device. However, in paged mode device, if the row address did not change, a page hit condition, only a new column address had to be provided, thus allowing the data transfer to occur quickly. However, if the row address changed, a page miss condition, the full cycle had to be performed. Thus, paged mode devices could be used to improve the performance of the computer without the burden of a complex cache system. The Compaq 386 manufactured by Compaq Computer Corporation used paged memory techniques.

SUMMARY OF THE INVENTION

The present invention allows the use of a 64 kbyte cache memory with an 82385 while using a 32 bit wide data path from the main memory. The main memory is organized as 64 bits wide, with all 64 bits being obtained on each memory access. Only 32 bits are provided on each access. During a cache fill cycle all 64 bits of data remain valid for a second memory cycle, allowing the second memory cycle to be performed very quickly, preferably in zero wait states. Thus by obtaining 64 bits at one time and multiplexing 32 bits, system performance is not degraded by the need to perform two 32 bit transfers to fill the 64 bit line and yet only a 32 bit data bus need be provided on the circuit board. The main memory is implemented using paged memory techniques to further allow an increase in system performance.

A series of Programmable Array Logic (PAL) devices, a bus controller and a memory interface are used to implement the external logic needed to double the line size to 64 bits, allow the use of paged memory, allow the zero wait state second double word cache fill and allow the use of interchangeable circuit boards containing memory to operate correctly in the computer.

BRIEF DESCRIPTION OF THE DRAWINGS

A better understanding of the present invention can be obtained when the following detailed description of the preferred embodiment is considered in conjunction with the following drawings, in which:

FIGS. 6, 7 and 8 are schematic diagrams of various logic elements of the memory interface of FIG. 1;

DETAILED DESCRIPTION OF THE PREFERRED EMBODIMENT

Figure 1:
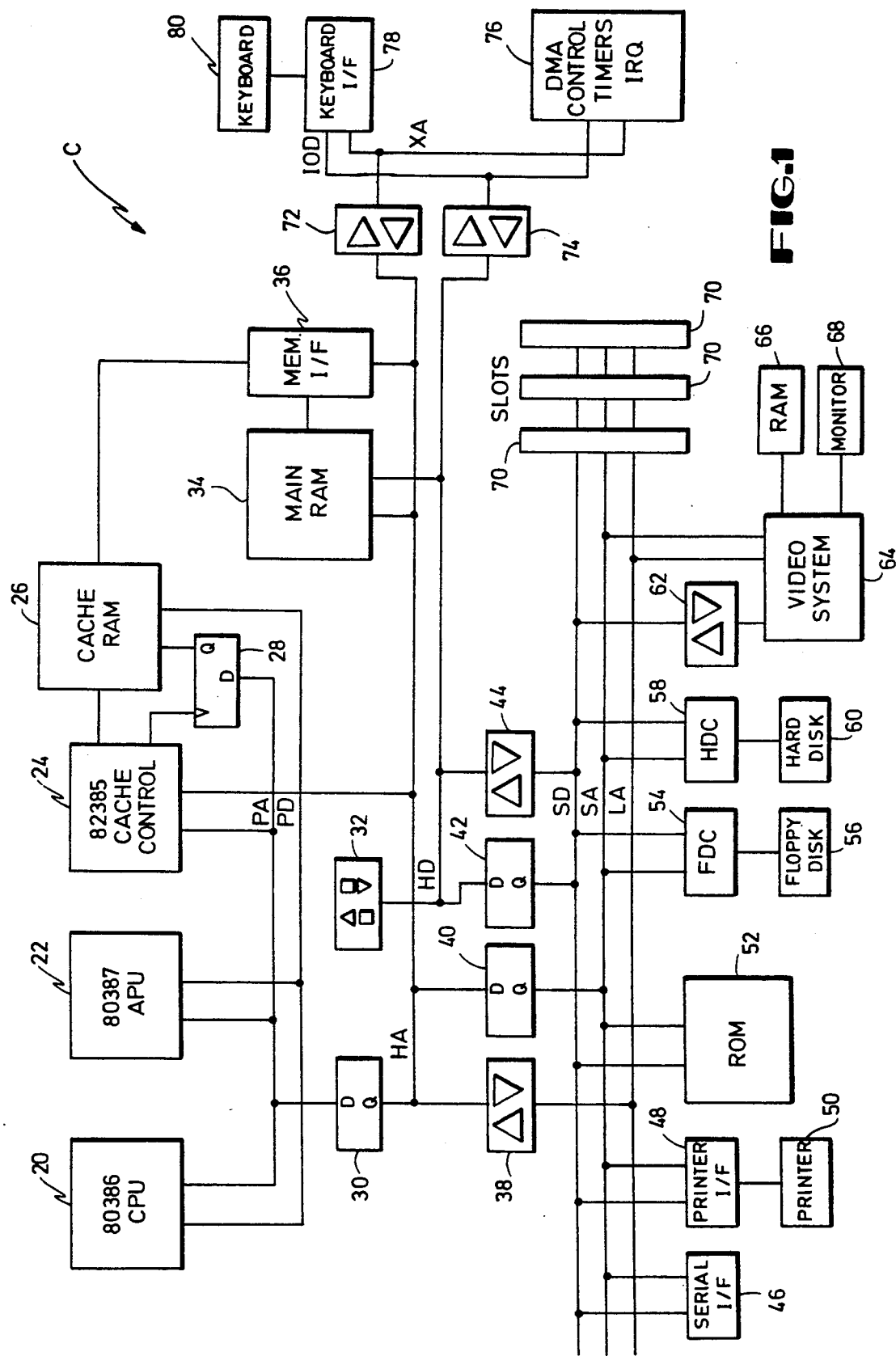
FIG. 1 is a block diagram of a computer incorporating the present invention.

Referring now to FIG. 1, the letter C generally represents a computer incorporating the present invention. A number of different blocks are used in the computer C. The microprocessor 20 used is preferably an 80386 microprocessor manufactured by Intel Corporation (Intel). The microprocessor 20 has an address bus PA and a data bus PD, these buses PA and PD being referred to as the local buses. Coupled to the local bus are an arithmetic processing unit or numerical coprocessor 22, preferably an 80387 manufactured by Intel; a cache controller 24, preferably an 82385 manufactured by Intel; cache RAM 26 and an address latch 28. The cache controller 24 cooperates with the cache RAM 26 to provide the necessary control to handle a cache system in the computer C. The local bus is connected to an intermediate bus by means of a latch 30 which connects the local address bus PA to an intermediate address bus HA. A latched transceiver 32 connects the local data bus PD to an intermediate data bus HD. Connected to the intermediate bus is the main memory 34 in the computer C and a memory interface 36. The memory 34 is thus relatively tightly coupled to the processor 20.

Various other buses are developed from the intermediate bus. For example, intermediate address bus HA is coupled by a transceiver 38 to an early system address bus LA and by a latch 40 to a latched system address bus SA. The intermediate data bus HD is coupled by a latch 42 and a transceiver 44 to the system data bus SD.

Numerous devices are coupled to the system buses LA, SA and SD, as are a series of slots 70 which are used for receiving interchangeable circuit boards which contain additional functions which can be utilized in the computer C. A serial interface 46 is connected to the system data bus SD and the latched system address bus SA. A printer interface 48 is also connected to the system data bus SD and the latched system address bus SA, with a printer 50 being attached to the printer interface 48. The read only memory (ROM) 52 which contains the basic operating software of the computer C is connected to the system data bus SD and the latched system address bus SA. A floppy disk controller 54 is connected to the system data bus SD and to the latched system address bus SA. A floppy disk unit 56 which is used for providing storage for the computer C is connected to the floppy disk controller 54. Similarly, a hard disk controller 58 is connected to the system data bus SD and the latched system address bus SA, with a hard disk unit 60 being attached to the hard disk controller 58. A video system 64 which controls the presentation of data to the user is connected to the early system address bus LA and the latched system address bus SA, and coupled to the system address data bus SD by means of a transceiver 62. Connected to the video system 64 are the Random Access Memory (RAM) 66 used to form the video memory and a monitor 68 which presents the desired display to the user.

Various other subsystems are coupled to the intermediate data and address buses HD and HA. A transceiver 72 is connected to the intermediate address bus HA and to an extended address bus XA. A transceiver 74 is connected between the intermediate data bus HD and an input/output (I/O) data bus IOD. Connected to the extended address bus XA and the data bus IOD, is a combined unit 76 which contains the DMA controller for the computer C, a series of timers and the interrupt controller. A keyboard interface 78 is also connected to the extended address bus XA and the I/O data bus IOD. A keyboard 80 is connected to the keyboard interface 78 to allow the user to enter desired character sequences and commands.

Figure 2:
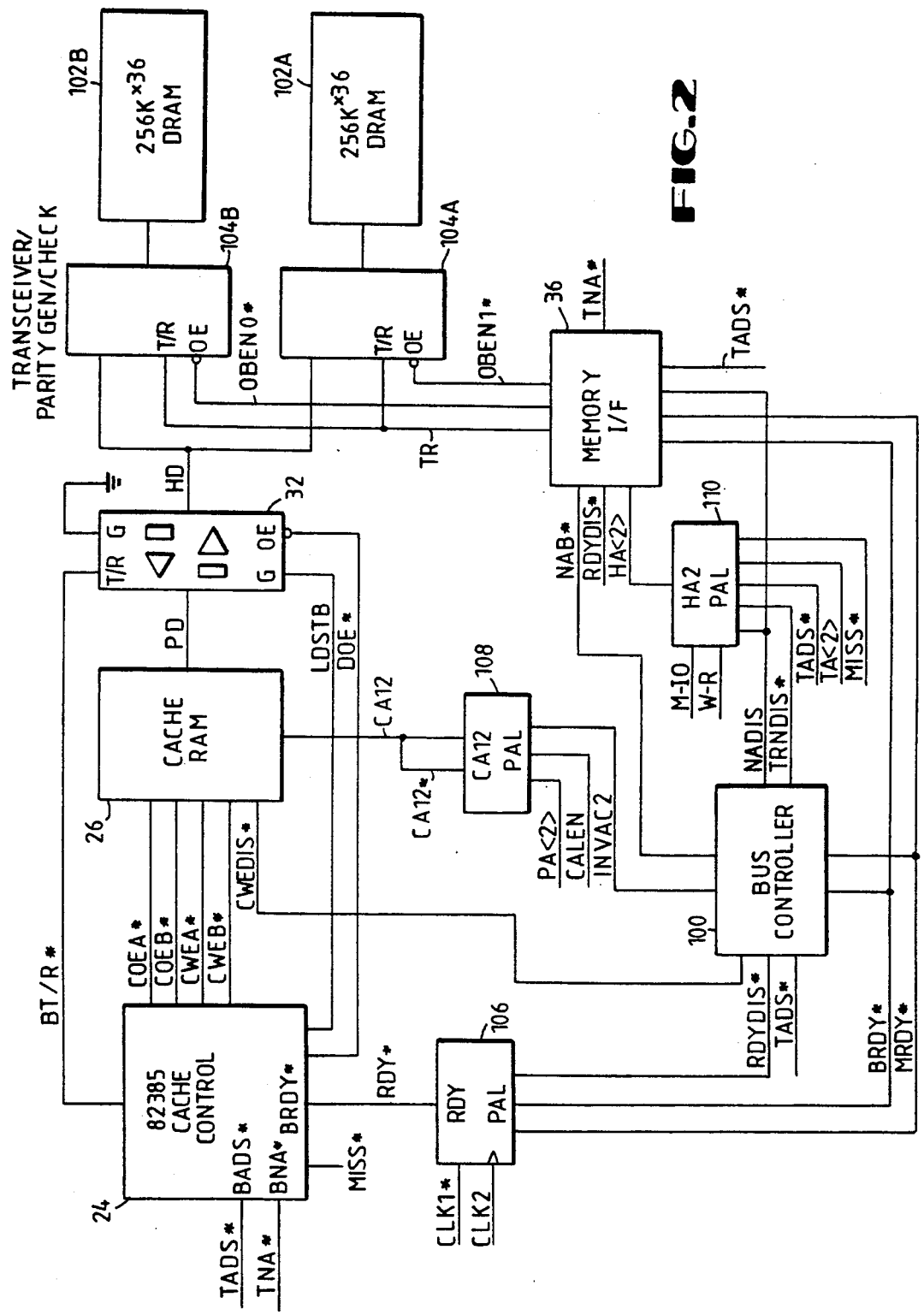
FIG. 2 is a block diagram of the cache memory, main memory and certain interface and control logic of the computer of FIG. 1.

Further details of the cache memory and main memory subsystems are showing in FIG. 2. The cache controller 24 provides a series of enable signals to the cache RAM 26. The 4 enable signals are the COEA*, COEB*, CWEA* and CWEB* signals which are the output enable and write enable signals for ways A and B of the cache RAM 26, which is configured as a two blocks of 8 k by 32 bit memory because the cache controller 24 is preferably operated in a two-way set associative mode. The cache controller 24 is also connected to the latched transceiver 32 connected between the local data bus PD and the intermediate data bus HD. A signal referred to as BT/R* is connected to the direction control input of the latched transceiver 32, while a signal referred to as DOE* is connected to the output enable input of the latched transceiver 32. The latching input related to the latch for data being transferred from the intermediate data bus HD to the local data bus PD is grounded, while the latch input for the data direction from the local data bus PD to the intermediate data bus HD is connected to the LDSTB signal produced by the cache controller 24. Thus, the cache controller 24 handles the transfer of data between the intermediate data bus HD and the local data bus PD based primarily on whether there are cache read hits or misses or cache write hit or misses.

As mentioned in the Intel application note, external logic must be used to control various signals relating to memory cycles when a 64 kbyte cache is used with the 82385. The memory interface 36, a bus controller 100 and three Programmable Array Logic (PAL) devices 106, 108 and 110 perform these functions. Various timings of these signals will be described in detail later. The RDY* signal provided to the cache controller 24 to indicate that the responding device is ready and thus a transfer cycle can proceed comes from the RDY PAL 106 and is the combination of the CLK1 signal, the BRDY* signal, the MRDY* signal and the RDYDIS* signal according the following equation:

$$RDY. = CLK1^* \cdot BRDY \cdot RDYDIS^* + CLK1^* \cdot MRDY \cdot RDYDIS^* + CLK1 \cdot RDY$$

which is latched by the CLK2 signal. The BRDY* signal indicates that devices connected to the system or input/output buses are ready. The MRDY* indicates that the main memory 34 is ready. The RDYDIS* signal is used to disable forwarding of ready signals during the first 32 bit access of a 64 bit cache fill operation. The CLK1 and CLK2 signals are clocking signals provided according to the requirements of the 80386 family and are preferably 33 and 66 MHz, respectively.

In general when referring to signals in this description, an asterisk (*) after a signal mnemonic indicates that it is logically true when a low voltage level is present and angle brackets with included numbers after a signal mnemonic are used to indicate single or multiple bit positions in a wider logical signal, such as the data or address fields.

The TNA* signal is the next address signal which is connected to the BNA* input of the cache controller 24 and is produced by the combination of the NAB* signal which is the next address signal relating to the system bus, the NAM* signal which is produced by the memory interface 36 to indicate that the memory system is ready for the next address and the NADIS signal produced by the bus controller 100 which indicates that the next address signal is to be suppressed to the cache controller 24.

The address bit manipulation as required for the 64 kbyte cache control is done at two different locations. The first location is the CA12 PAL 108 which provides the high order bit to the address of the cache RAMS to allow selection of the proper double word (dword). The CA12 signal is produced by the CA12 PAL 108 based on the PA<2>, CALEN, and INVCA2 signals. The PA<2> signal is the bit position 2 of the local address bus PA, the CALEN signal is the address latch enable signal produced by the cache controller 24 and the INVCA2 signal is produced by the bus controller 100 when it is appropriate to invert the PA<2> signal. The equations for the operation of the CA12 PAL 108 are as follows:

$$LA2 = PA<2> \cdot CALEN + LA2 \cdot CALEN^* + PA<2> \cdot LA2$$
$$CA12 = PA<2> \cdot CALEN + LA2 \cdot CALEN^* + PA<2> \cdot LA2,$$
$$\text{Enabled by } INVCA2^*$$
$$CA12^* = PA<2>^* \cdot CALEN + LA2^* \cdot CALEN^* + PA<2>^* \cdot LA2^*, \text{ Enabled by } INVCA2$$

Figure 3:
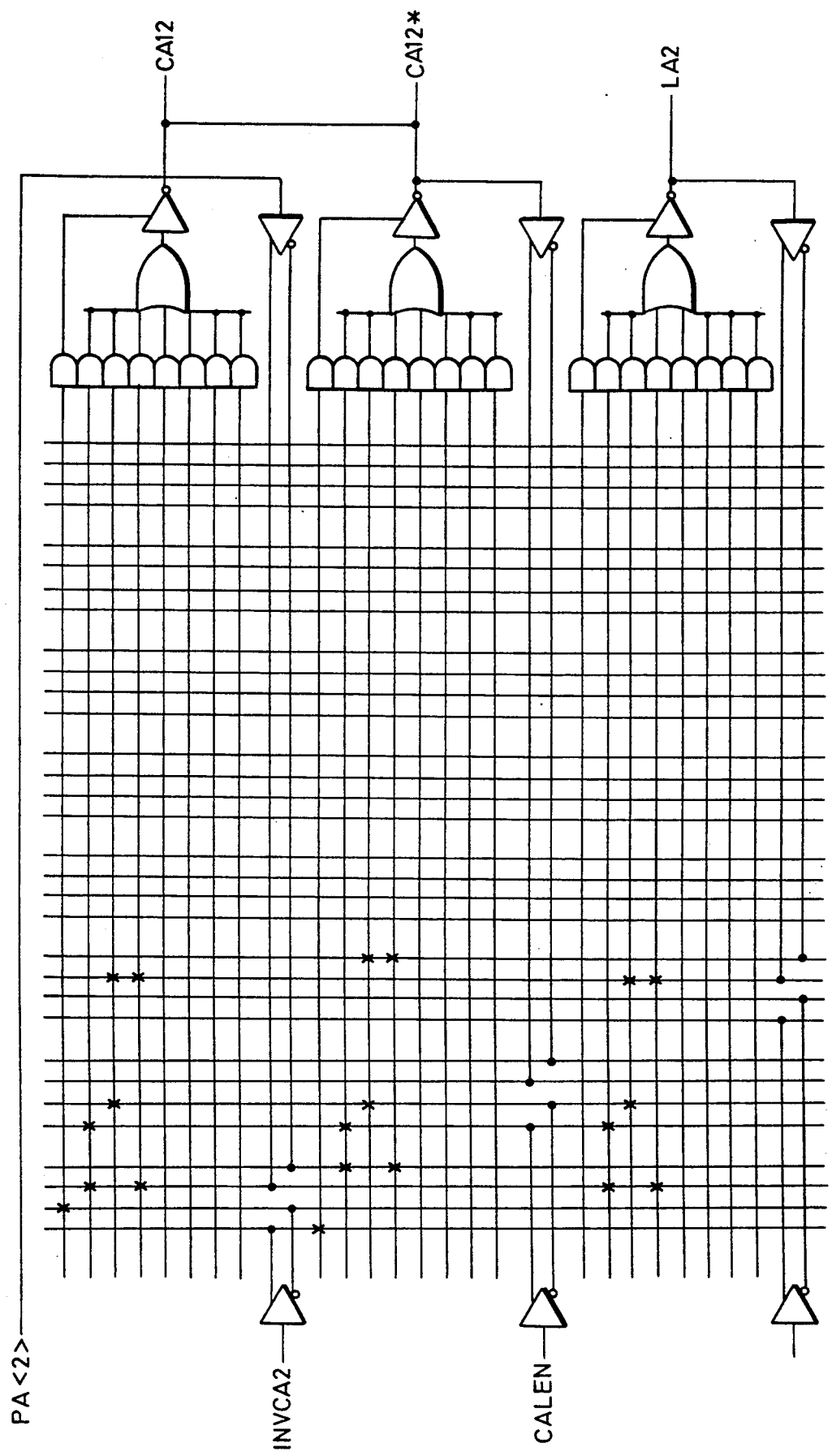
FIG. 3 is a schematic diagram of one logic device of FIG. 2.

The configuration of the CA12 PAL 108 is shown in more detail in FIG. 3. The CA12 PAL 108 is configured in this orientation because of timing requirements from the known validity of the PA<2> signal to the time when the address needs to be stable for use by the cache RAM 26. In the preferred embodiment which uses a 33 MHz 80386 this available time is 8 nanoseconds. The CA12 PAL 108 has a 7.5 nanosecond throughput from receipt of the valid PA<2> signal to the presentation on the CA12 or CA12* signal. However, if the INVCA2 signal was utilized to switch between the two CA12 or CA12* signals for connection to the memory, this time is not adequate because there is a 10 nanosecond delay from the time the buffers are enabled for the particular parts being utilized. This critical path timing condition is only present during read and write hit operations and is not critical during read miss operations, so that during read miss operations the output buffering can be switched because substantially more time is available because a long cycle has to be performed to obtain the data from the main memory. Thus, the straight through path of 7.5 nanoseconds is utilized during normal cache operations, with slower speed enable switching occurring only during cache fill operations in which the time factor is not critical.

The HA<2> signal which is utilized by the main memory and the addressing of the various system buses is developed in the HA2 PAL 110. The HA2 PAL 110 uses input signals NADIS, TRNDIS*, TADS*, TA<2>, MISS*, M-IO and W-R to produce HA<2>. The NADIS signal, which indicates that the next address is to be disabled for use in the 64 bit cache fill and the TRNDIS* signal which indicates that the 64 bit cache fill operations are disabled, are provided by the bus controller 100. The TADS* signal, the address status signal from the cache controller 24, and the MISS* signal, which indicates that the cache controller 24 has determined that a read miss operation has occurred, are provided by the cache controller 24. The M-IO and W-R signals are latched versions of the M-IO and W-R signals provided by the processor 20. The TA<2> signal is the output of the latch 30 which is connected to the local address bus PA. While the other 29 address lines <31-3> of the intermediate address bus HA are provided directly by the latch 30, the bit 2 line is actually developed by the HA2 PAL 110 because of the need to derive this based on the 64 bit cache fill external logic. The equation for the HA<2> output is as follows:

$$HA<2>^* = ((TA<2>^* \cdot NADIS^*) \cdot (M\text{-}IO^* + TADS^* + MISS^* + TRNDIS + W\text{-}R)) + (NADIS \cdot TA<2>) + (MISS^* \cdot TADS^* \cdot W\text{-}R^* \cdot M\text{-}IO \cdot TRNDIS^* \cdot TA<2>)$$

Thus the TA<2> signal is generally passed except during the first portion of the 64 bit cache fill operation as indicated by the last two terms of the equation.

The address lines connected to both the main address line inputs and the snoop bus address line inputs of the cache controller 24 are shifted. The PA<31-29> lines are connected to the A<31-29> inputs of the cache controller 24 to allow proper coprocessor 22 operation. The PA<23-3> lines are connected to the A<22-2> inputs of the cache controller 24, with the A<28-23> inputs being grounded. This accomplishes the address shifting to quadruple word (qword) operation of the cache controller 24 on the local address bus PA side. Similiar connections are made between the intermediate address bus HA and the snoop bus inputs of the cache controller 24. The HA<23-3> lines are connected to the BA<22-2> inputs, with the BA<31-23> inputs being grounded. Thus snoop bus operations are also on a qword basis.

The memory interface 36 controls the multiplexing of the data of the main memory 34 which is configured as being 64 bits wide, with connection to the 32 bit wide intermediate data bus HD. The preferred embodiment of the main memory 34 comprises two separate banks 102A and 102B, each bank being 36 bits wide, that is 32 bits of data and 4 bits of parity, and at least 256 k long and formed using dynamic random access memory devices. The combination of banks 102A and 102B thus forms a 2 Mbyte memory which is configured as 64 bits wide. This memory can, of course, be extended to greater sizes, up to 16 Mbytes in the preferred embodiment. The data lines of the memory banks 102A and 102B are connected to two 32 bit parity generator/checker/transceiver devices 104A and 104B. The parity/transceiver devices 104A and 104B serve as both parity devices and as transceiver/multiplexers for the flow of data between the intermediate data bus HD and the memory banks 102A and 102B. The direction is controlled by the T-R signal produced by the memory interface 36 so that the data flows to the memory banks 102A and 102B during write operations and from the memory 102A and 102B during read operations. Each transceiver/parity unit 104A and 104B has independent output enable controls so that only 32 bits of data are provided to the intermediate data bus HD at a given time. Selection of which particular transceiver/parity unit 104A or 104B is driving the intermediate data bus HD or transferring from the intermediate data bus HD is performed by the memory interface 36 by means of the OBEN0* and OBEN1* signals, which are connected to the output enables of the transceiver/parity units 104A and 104B. Thus, the memory interface 36 performs the multiplexing logic needed to allow the 64 bit wide memory 34 to work with the 32 bit wide intermediate data bus HD. Thus, by the interaction of the bus controller 100 and the memory interface 36, the 64 bit wide memory 34 can be transferred over the 32 bit data buses PD and HD to the cache RAM 26 for storage.

A signal is transmitted from the bus controller 100 to the memories forming the cache RAM 26 for purposes of a forcing an extra write operation during the qword cache fill. The signal, the CWEDIS* signal, is used as the write strobe for the first 32 bit dword write operation of a 64 bit qword cache fill. The memory devices forming the cache RAM 26 preferably have two chip enable inputs, one high true and one low true which function in an ANDed arrangement so that when one or the other of the chip enables is removed, the chip is disabled, thus, in the case of a pending write operation, latching in the data which has been presented. Thus, the cache controller 24 can utilize one chip enable of the memory devices and the write enable in a normal fashion in the cache RAM 26 while the bus controller 100 can use the high true chip enable input with the CWEDIS* signal to force a write operation to occur in the first half of the cache fill.

The main memory 34 is configured for paged mode operation and thus has several different timing cycles, depending upon write or read operation, page hit or miss and the previous cycle.

Figure 9:
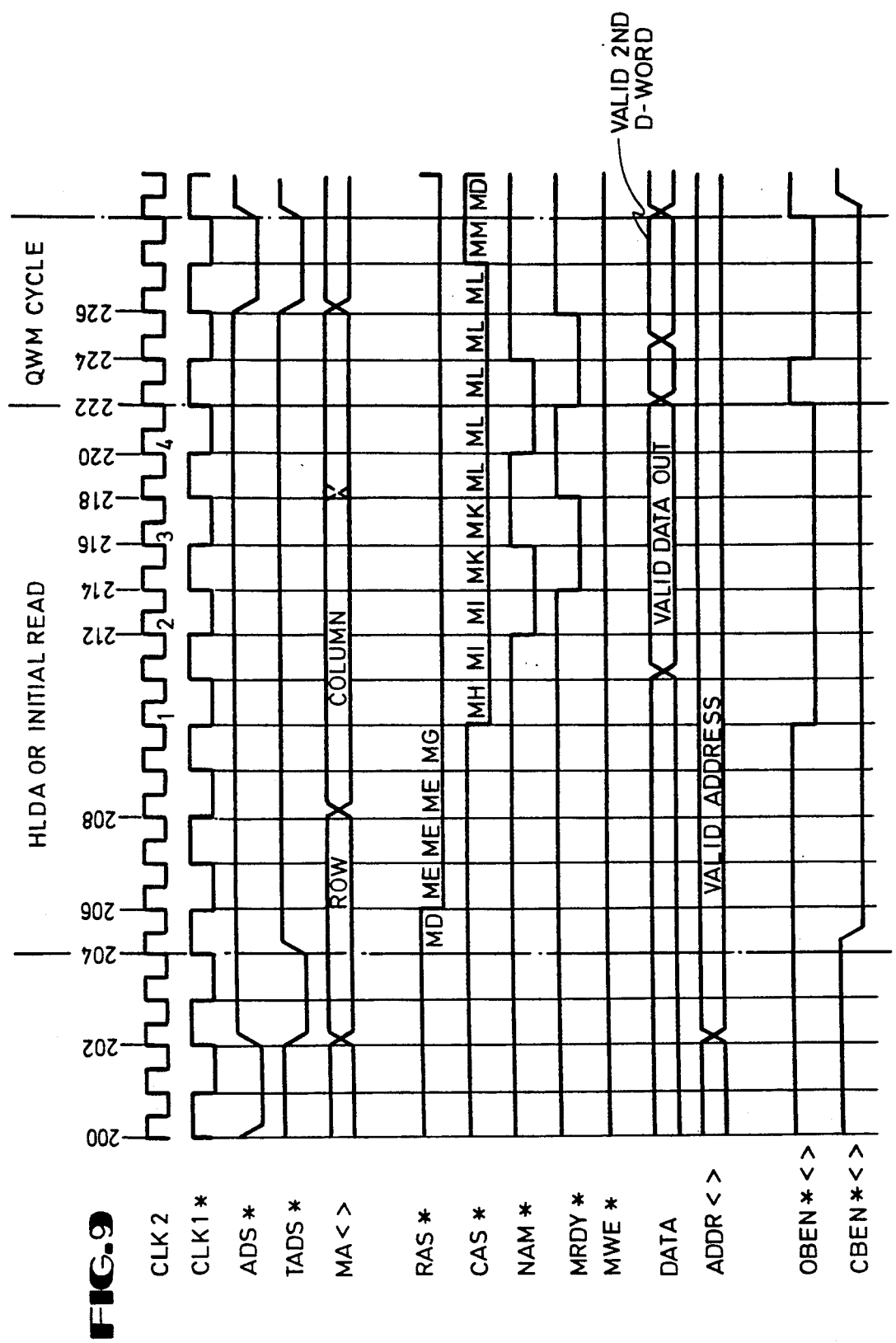
FIGS. 9, 10, 11 are timing diagrams of various signals relating to the memory interface of FIG. 1.
Figure 10:
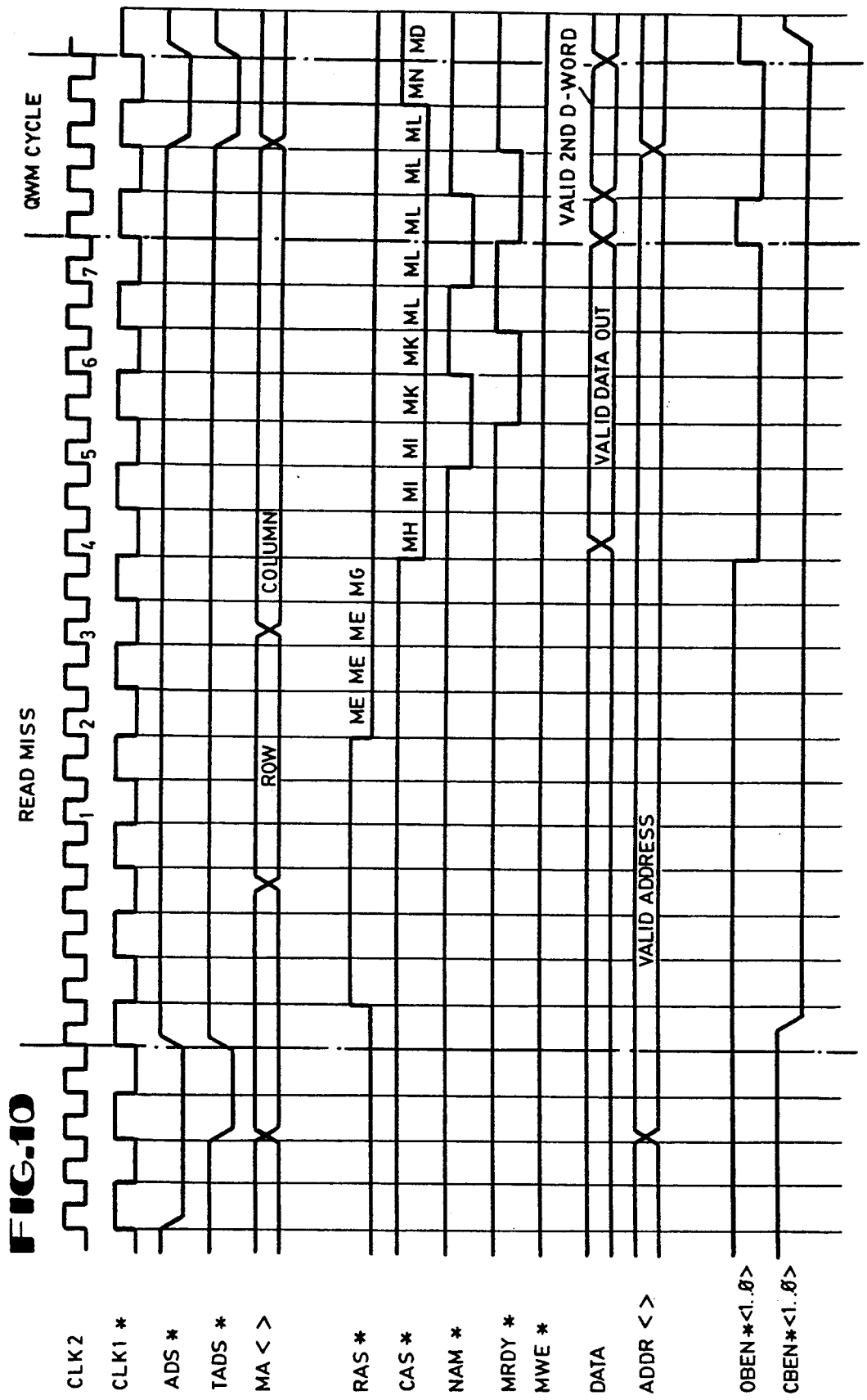
Figure 11:
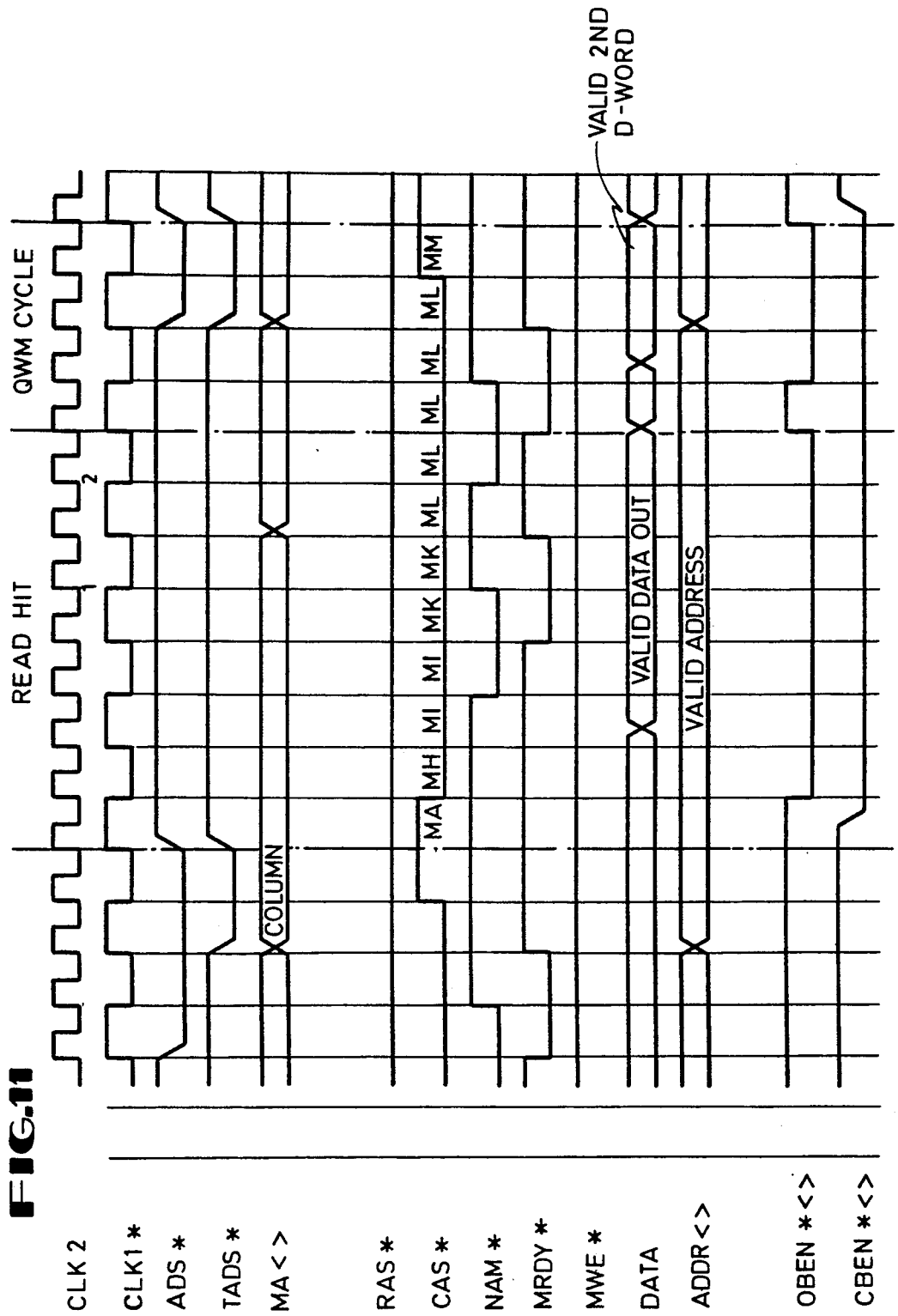

Timing diagrams for three of the possible conditions of the main memory 34 all shown in FIGS. 9, 10, and 11. FIG. 9 illustrates the timing for initial or HLDA read operations and a qword multiplexed (QWM) cycle. A QWM cycle is the second half of a cache fill operation and is so labeled because of the multiplexing being performed, so that the qword data can be transferred over the dword intermediate data bus HD. HLDA operations are performed during DMA or other operations, except refresh, where the processor 20 is held and during the initial operation performed on reset of the microprocessor 20. Refresh operations utilize a different state machine which is not shown. FIG. 10 illustrates read miss and QWM cycle timing, when a page miss has occurred to the paged memories and thus a full cycle of row and column addresses with appropriate RAS precharging must be supplied. FIG. 11 illustrates the read hit and QMW cycle timing. In a read hit, only the column addresses need to be changed and so this is the fastest mode of paged mode operation. Shown with the RAS* and CAS* signals on the three timing diagrams are the states of the main memory state machine M which is detailed in FIG. 4.

Turning now to FIG. 9 in the HLDA or initial read timings, at time 200 on the rising edge of the CLK2 signal and the falling edge of the CLK1 signal indicating a T1 state, the processor 20 lowers the ADS* signal to indicate the completion of one cycle and the beginning of the next cycle. At time 202, the next falling edge of the CLK1 signal, the processor 20 raises the ADS* signal and the TADS* signal which is provided by the cache controller 24 to the bus controller 100 and the memory interface 36 is lowered. At this time 202 the new address values are presented on the local and intermediate address buses PA and HA. A portion of the address values on the intermediate address bus HA are immediately provided to the memory devices forming the main memory 34 such that at time 202 the row addresses are provided as shown in the MA<> signal. At time 204, the next falling edge of the CLK1 signal, the TADS* signal is raised and the read operation is commencing. Also, at time 204 the CBEN*<1-0> or CAS bank enable signals are lowered as appropriate to allow the column address strobes to be transferred to the appropriate memory devices.

At time 206, the next rising edge of the CLK2 signal, the RAS* signal is made low to communicate to the memory devices that the row address is present and is valid. At time 208, the next rising edge of the CLK1 signal, the addresses being provided to the memory devices are changed so that now the column addresses are being provided. At time 210, the next rising edge of the CLK1 signal, the CAS* signal is made low to indicate to the enabled memory devices that the column addresses are present, so that the full addresses have now been provided to the memory devices. Additionally at time 210, the OBEN*<1-0> signal which is appropriate is lowered so that the data which is to be provided by the main memory 34 or provided to the main memory 34 can be transferred. At time 212, the next rising edge of the CLK1 signal, the memory interface 36 lowers the NAM* signal indicating that the present read cycle for the 32 bit dword is completing and the next address can be asserted by the processor 20. At time 214, the next rising edge of the CLK2 signal, the MRDY* signal is lowered to indicate that the memory is ready, which signal is utilized by the bus controller 100 and the RDY PAL 106 to provide the RDY signal to the cache controller 24. In this case, because a QWM cycle will be performed, these NAM* and MRDY* signals are not provided to the cache controller 24 because a second operation is to occur. At time 216, the next rising edge of the CLK2 signal, the NAM* signal is raised so that the NAM* signal was low for one CLK1 signal cycle. At time 218, the next rising edge of the CLK2 signal, the MRDY* signal is raised so that it was low for one CLK1 signal cycle. At time 220, the next rising edge of the CLK2 signal, the NAM* signal again goes low. Because it is known that the second 32 bit access for a QWM cycle will be performed and the QWM cycle is a zero wait state cycle in the preferred embodiment, the NAM* signal can be lowered at this time to proceed to the next cycle of the system. At time 222, the next rising edge of the CLK2 signal, the MRDY* signal is lowered so that the various other parts of the system determine that the memory is and will be providing data according to these timing characteristics. Also at time 222, the OBEN*<1-0> signals are taken high for one CLK2 signal cycle so that data output can be switched between the 32 bit memory banks 102A and 102B of the main memory 34. At time 224, the next rising edge of the CLK2 signal, the NAM* signal is raised and the appropriate OBEN*<1-0> signal is lowered so that the proper data is presented. At time 226, the next rising edge of the CLK2 signal, the MRDY* signal is raised and the next cycle is commenced. The cycle is commenced by the microprocessor 20 lowering the ADS* signal at time 226, and in this case, the TADS* signal is also lowered at this time. The timing of the HLDA or initial read cycle is such because sufficient RAS precharge time is provided prior to the cycle and so this timing can be utilized.

If a read miss (FIG. 10) were to occur, a longer timing cycle occurs because of the necessary time to perform a RAS* precharge of the memory devices. The HLDA cycle does not need this extra time because prior to each HLDA or initial cycle the computer C does not access the memories so that the precharge times can be met without requiring a full delay of the computer C. The timing of the read miss cycle is similar to the HLDA cycle of FIG. 9 after the three CLK1 signal cycle RAS precharge time. The row addresses are not applied the same time as the TADS* signal goes low because of precharge requirements, but are delayed until after the precharge time.

The read hit cycle of FIG. 11 is the optimal cycle and the one which is preferably performed most often. This is because it is a short cycle, no RAS precharging is necessary and only column addresses need to be changed. Thus, at the presentation of the TADS* signal the column addresses are immediately presented to the memory devices and the cycle proceeds from that point, so that only a two wait state operation occurs using the preferred devices. The different cycle operations will be clearly shown in the explanation of the main memory interface state machine M.

Whether a read miss or read hit occurs is determined using a series of latches and comparators which determine the previous row address supplied to the memory devices and the present row address which is being supplied to the memory devices. If these two addresses are the same, this is considered a hit operation and thus the faster cycle can be performed. If they are different, and a HLDA operation is not occurring, a miss cycle is run. If a HLDA operation is occurring, the HLDA cycle is always run.

Figure 4:
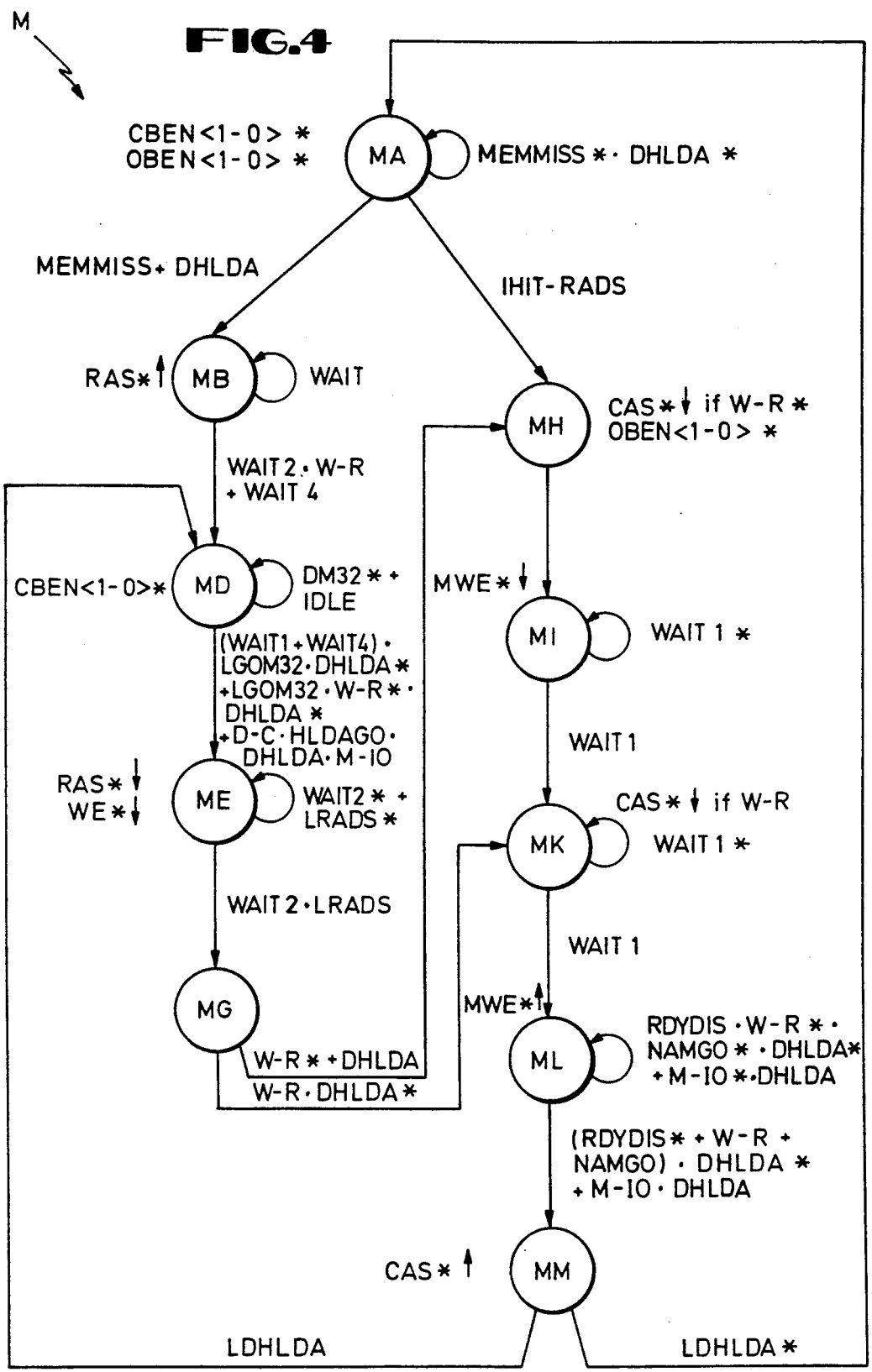
FIGS. 4 and 5 are state machine diagrams of portions of the memory interface of FIG. 1.
Figure 5:
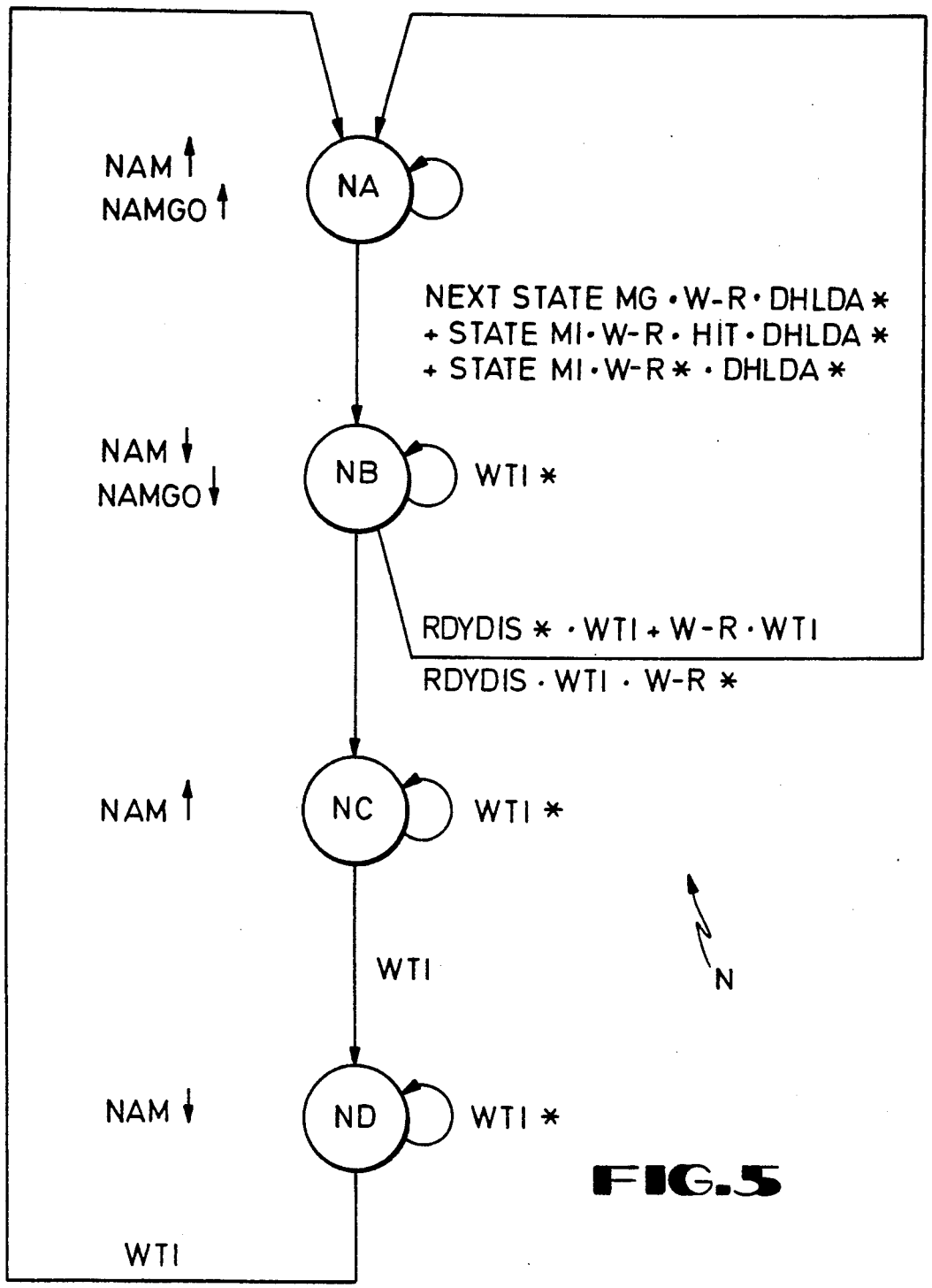

The main memory interface state machine M of FIG. 4 and the next address memory state machine N of FIG. 5, are used with various logic shown in FIGS. 6, 7, 8, and 14 to develop the necessary signals of the memory interface 36 for controlling the operation of the main memory 34.

On reset, the main memory state machine M starts at state MD (FIG. 4). The main memory state machine M is clocked on the rising edge of the CLK2 signal. In the state machine figures referenced in this specification, an indicated operation next to a state circle is performed on entering the state. The conditions for taking a given branch from a state are indicated next to the branch. At state MD, the CBEN*<1-0> signals are correctly driven based on the address provided and the read or write selection of the request. The CBEN0* signal is provided by a latch 250 (FIG. 8), while the CBEN1* signal is provided by a latch 252. The enable signal to the two latches 250 and 252 is provided by the output of an OR gate 254 whose inputs are signals indicating that the main memory state machine M is in state MA or in state MD. Thus, when the main memory state machine M is in one of those two states, the address presented at the D input of the latches 250 and 252 is passed through and latched, forming the CBEN0* and CBEN1* signals. The D input of the CBEN0* latch 250 is connected to the output of a NOR gate 256. This NOR 256 gate has two inputs, one connected to the output of a 2 input AND gate 258 and the other connected to the output of a 3 input AND gate 260. The two input AND gate 258 has inputs of the DM32 signal and the W-R* signal. The DM32 signal is a decoded signal that indicates that memory contained in the main memory 34 is actually being addressed. The W-R* signal is developed by the processor 20 and indicates that a read cycle is being desired. The inputs to the three input AND gate 260 are the DM32 signal, the W-R signal, and the HA<2>* signal. Thus the CBEN0* signal is lowered on properly addressed read operations and on write operations when bit two of the address is a zero.

The D input of the CBEN1* latch 252 is connected to the output of a 2 input NOR gate 262. This 2 input NOR gate has its inputs connected to the outputs of a 2 input AND gate 264 and a 3 input AND gate 266. The two input AND gate 264 has inputs of the DM32 signal and the W-R* signal. The 3 input AND gate 266 has input signals of the W-R signal, the DM32 signal and the HA<2> signal. Thus the CBEN1* signal goes low during properly addressed read cycles and during write cycles when bit 2 of the address line is a one.

The direction control of the transceivers/parity 104A and 104B is provided by a T-R latch 268 whose output is the T-R* signal. The T-R latch 268 has its enable input connected to the output of the OR gate 254 and has its D input connected to the output of a two input AND gate 270. The inputs to the two input AND gate 270 are the DM32 and W-R signals. Thus, whenever a properly addressed write operation is occurring, the T-R* signal is high.

Figure 7:
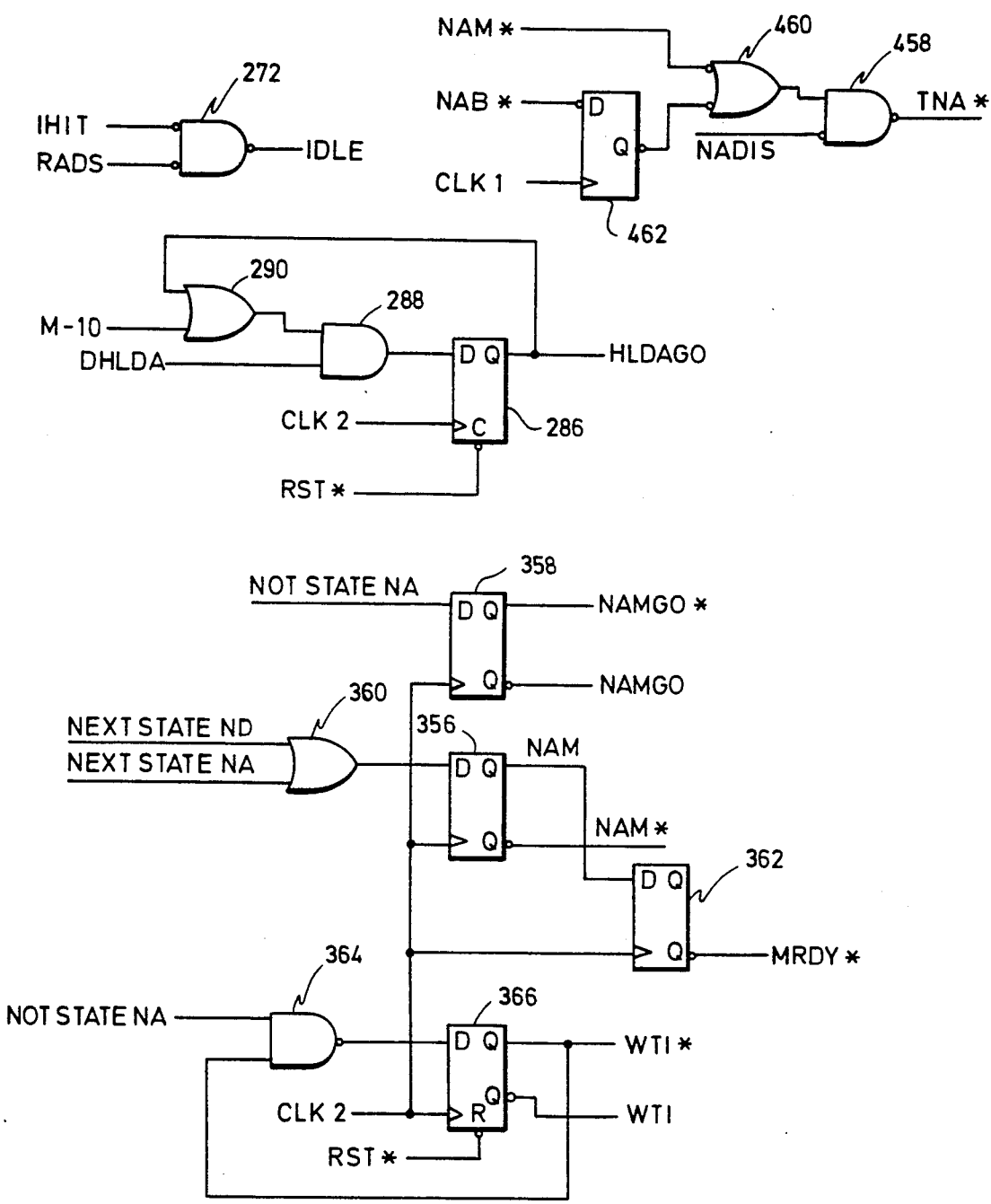

The main memory state machine M stays in state MD while the DM32 signal is low or when a signal referred to as IDLE is high. The IDLE signal is produced by a 2 input OR gate 272 (FIG. 7). The inputs to the OR gate 272 are the RADS signal and the IHIT signal. The RADS signal is the rising edge of the ADS* signal, while the IHIT signal indicates that there has been a paged memory hit. Until either one of those conditions occurs, the main memory state machine M stays in state MD. The main memory state machine M leaves state MD on any of three different conditions. The first condition is if the WAIT1 or WAIT4 signals are true, these signals being such that they are the specified number of CLK2 signal delays from the entry into a new state, the LGOM32 signal is high and the DHLDA* signal is high. The DHLDA signal is the notation for the synchronized version of the HLDA signal, which in turn is provided in the system. The LGOM32 signal is a latched DM32 signal which indicates that it is appropriate to access the memory.

The LGOM32 signal is the output of an OR gate 274 (FIG. 8). One input of the OR gate 274 is inverted and is connected to the inverting output of a latch 276. The second input to the OR gate 274 is connected to the output of an AND gate 276. One input to the AND gate 276 is inverted and is connected to the GOM32* signal. The other input to the AND gate is not inverted and is connected to the D input of the latch 276 and to the output of a 2 input AND gate 278. The two inputs to the AND gate 278 are the DM32 signal and the M-IO signal. A high level on the AND gate 278 indicates that a memory cycle is in progress and that it has been properly addressed to the main memory 34. The enable input of the latch 276 is connected to the GOM32 signal while the low true clear input is connected to the output of a 2 input AND gate 280. The inputs to the AND gate 280 are the RST* signal, which is reset signal for the computer C, and a signal referred to as NOT STATE MK, which indicates that the main memory state machine M is not in state MK. Thus the latch 276 is cleared on every entry to state MK of the main memory state machine M.

The GOM32 and GOM32* signals are the noninverted and inverted output of a flip-flop 282. The flip-flop 282 is clocked by the CLK2 signal and has its D input connected to the output of a 2 input AND gate 284, whose inputs in turn are the CLK1 signal and the TADS signal. The GOM32 signal thus indicates when an address cycle is beginning based on a TADS signal having appeared. Therefore the LGOM32 signal is present whenever a 32 bit memory access is being performed to the addressed space.

The second condition in which the main memory state machine M may leave state MD is that the LGOM32 signal is high, the W-R signal is low and the DHLDA* signal is low. The third condition for leaving state MD is that the D-C signal as provided by the cache controller 24 is high, a signal referred to as HLDAGO is high, the DHLDA signal is high, and the M-IO signal is high.

The HLDAGO signal is provided as the output of a flip-flop 286 (FIG. 7). The clocking input to the flip-flop 286 is connected to the CLK2 signal, while the clear input is connected to the RST* signal. The D input to the flip-flop 286 is connected to the output of a 2 input AND gate 288, one of whose inputs is connected to the DHLDA signal and whose other input is connected to the output of a 2 input OR gate 290. One input of the OR gate 290 is connected to the M-IO signal, while the other input is connected to the HLDAGO signal. Thus the HLDAGO signal is a latched version of the DHLDA signal during memory operations. Thus, the main memory state machine M proceeds from the state MD when a valid memory cycle needs to be run.

The main memory state machine M proceeds to state ME where the RAS* signal is lowered and the MWE* signal is lowered if appropriate. The main memory state machine M stays in state ME until at least two CLK2 cycles have been completed as indicated by the WAIT2* signal being low or while the LRADS* signal is low. The LRADS* signal is a signal indicating a latched version of the rising edge of the ADS* signal having been received.

Figure 14:
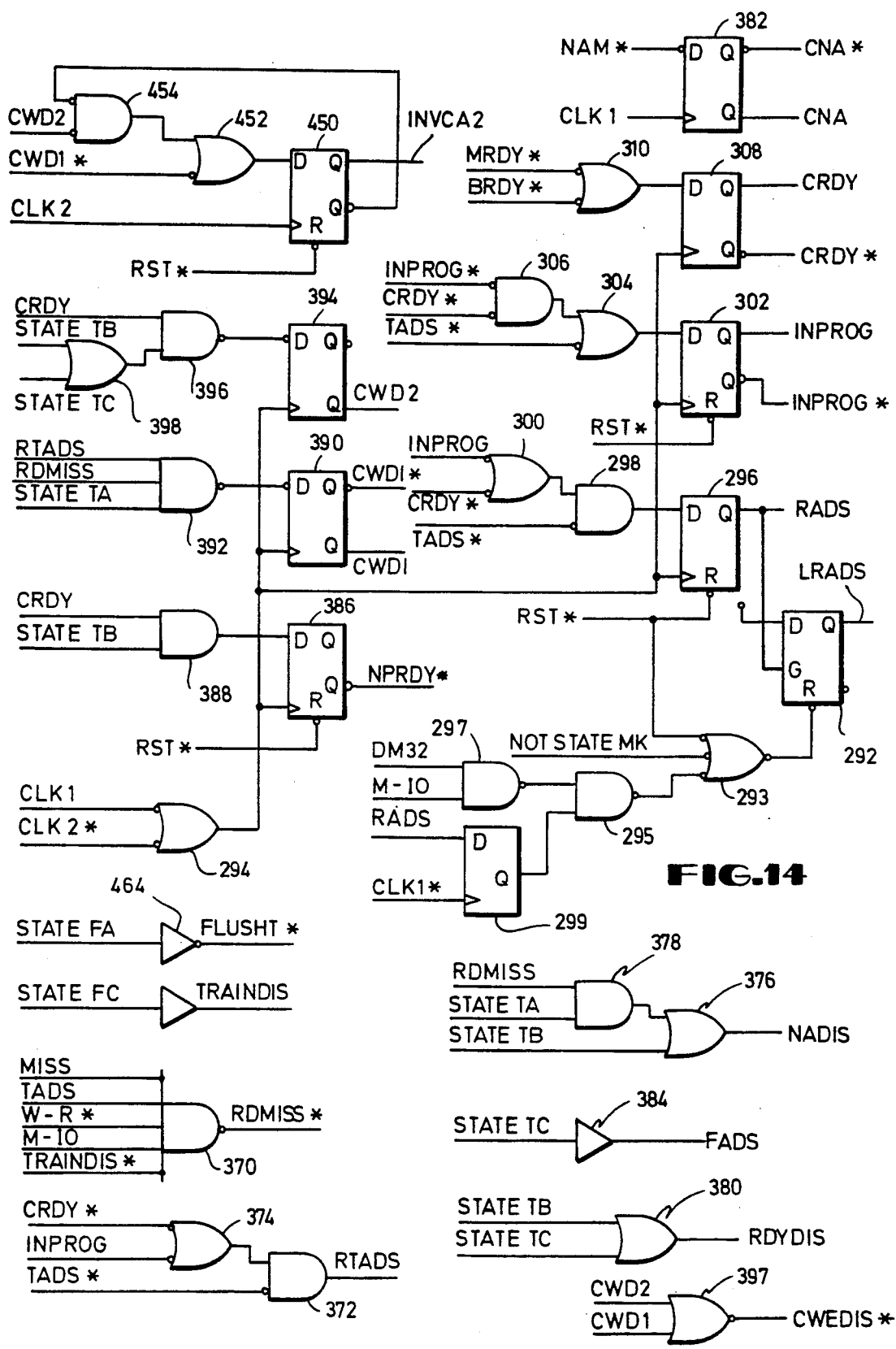
FIG. 14 is a schematic diagram of various logic elements of the bus controller of FIG. 2.

The LRADS* signal is developed at the noninverting output of a latch 292 (FIG. 14). The clocking signal of the latch 292 is provided by the RADS signal and the D input is tied high. The reset or clear input of the latch 292 is connected to the output of a three input AND gate 293. Two of the inputs of the AND gate 293 are the RST* signal and a NOT STATE MK signal, indicating that the main memory state machine M is not in state MK. The third input of the AND gate 293 is connected to the output of a two input NAND gate 295. One input of the NAND gate 295 is connected to the output of a two input NAND gate 297, whose inputs are the DM32 and M-IO signals. The other input to the NAND gate 295 is the output of a flip-flop 299, whose D input is connected to the RADS signal and which is clocked by the CLK1* signal. The RADS signal is produced by a flip-flop 296. The clear input to the RADS flip-flop 296 is connected to the RST* signal, while the clock signal is provided by the output of the NAND gate 294, whose inputs are the CLK1 signal and the CLK2* signal. The D input to the RADS flip-flop 296 is connected to the output of a 2 input AND gate 298. One input of the 2 input AND gate 298 is inverted and is connected to the TADS* signal. The second input to the AND gate 298 is connected to the output of a 2 input NAND gate 300 whose inputs are the INPROG signal and the CRDY* signal. The INPROG signal indicates that a cycle is in process and the CRDY* signal is an indication that either the bus is ready or the memory is ready.

The INPROG signal is produced by the output of a flip-flop 302 whose clock input is connected to the output of the NAND gate 294 and whose clear input is connected to the RST* signal. The D input of the flip-flop 302 is connected to the output of a 2 input OR gate 304, one of whose inputs is inverted and is connected to the TADS* signal. The other input to the OR gate 304 is connected to the output of a 2 input NOR gate 306 whose inputs are connected to the CRDY signal and the INPROG* signal. Thus, once a cycle is ready and the address strobe has been received, the INPROG signal remains latched.

The CRDY signal and the CRDY* signal are the noninverting and inverting outputs of a flip-flop 308 whose clocking input is also provided by the output of the NAND gate 294. The D input of the flip-flop 308 is connected to the output of a 2 input NAND gate 310 whose inputs are the MRDY* and BRDY* signals which indicate that the memory is ready or the bus or slots are ready for operations to proceed.

After two CLK2 cycles have proceeded and a rising edge of the ADS* signal has been received as indicated by the LRADS signal, control proceeds to state MG. The main memory state machine M remains in state MG for only one CLK2 signal cycle, with two different branches being available out of state MG. Which of the branches is taken depends upon whether an HLDA operation is in progress or whether a read operation is occurring. If the read operation is occurring as indicated by the W-R* signal being low or a HLDA cycle is in progress as indicated by the DHLDA signal being high, control proceeds to state MH. Otherwise control proceeds to state MK for non-held, write operations.

Figure 6:
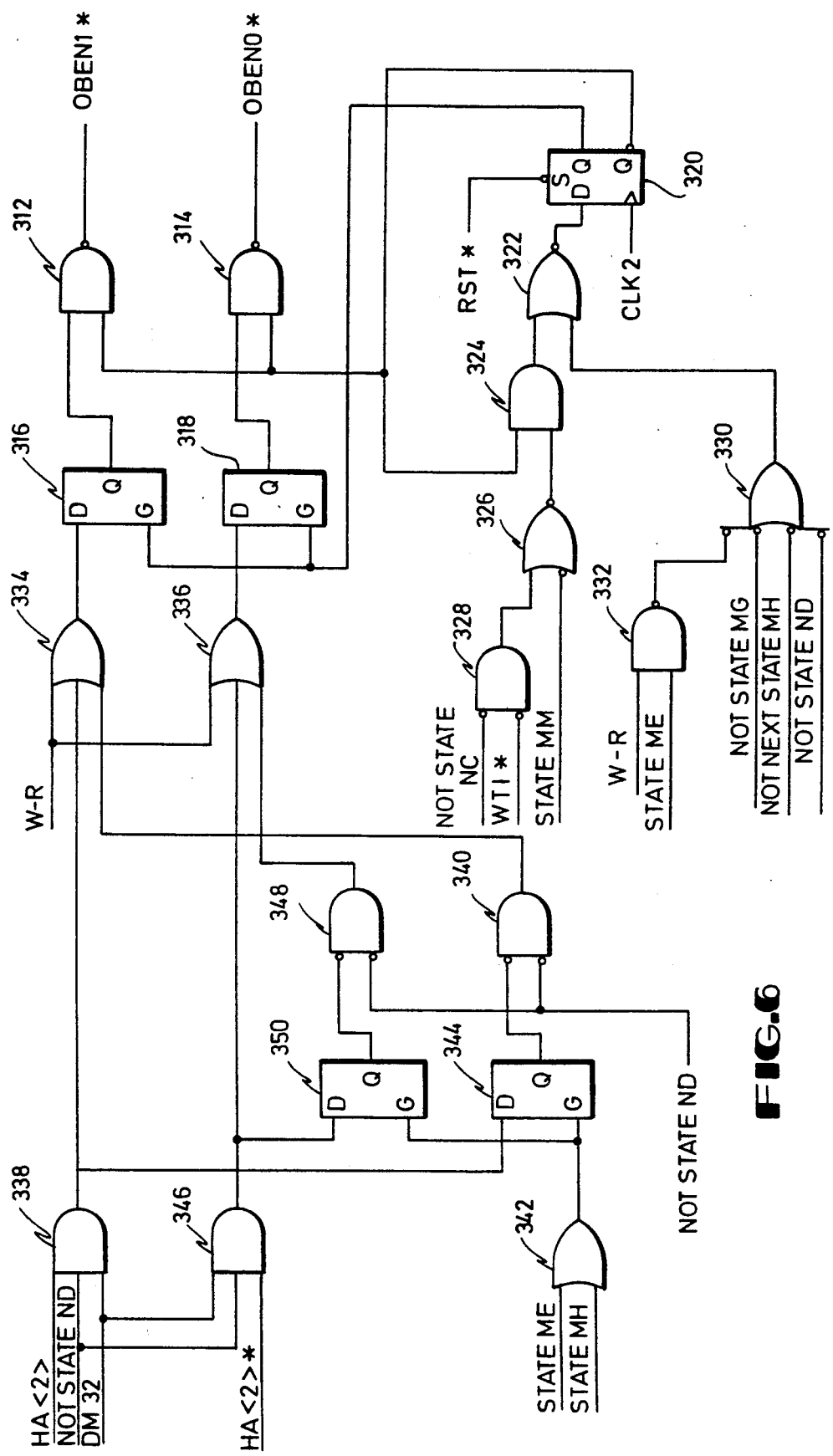

In state MH the column address strobe signal is lowered if a read operation is occurring and the OBEN-*<1-0> signals are properly set. The OBEN*<1-0> signals are produced by the outputs of 2 input NAND gates 312 and 314 (FIG. 6). One input of the OBEN1* NAND gate 312 is connected to the noninverting output of a latch 316 while one input of the OBEN0* NAND gate 314 is connected to the noninverting output of a latch 318. The other input of each NAND gate 312 and 314 is connected to the inverting output of a flip-flop 320. The noninverting output of the flip-flop 320 is connected to the enable inputs of the latches 316 and 318. The flip-flop 320 is used to disable the OBEN* signals and to properly time latching in the proper address state or read/write condition to enable the OBEN* signals as indicated in the timing diagram and based on the 32 bit dword which is to be obtained. The set input to the flip-flop 320 is connected to the RST* signal. The clocking input of the flip-flop 320 is connected to the CLK2 signal. The D input of the flip-flop 320 is connected to the output of a 2 input NOR gate 322. One input to the NOR gate 322 is connected to the output of a 2 input AND gate 324, one of whose inputs is the inverting output of the flip-flop 320 and whose other input is connected to the output of a 2 input NOR gate 326. The AND gate 324 is used to disable the OBEN* signal, depending upon the state of the main memory state machine M or the next address memory state machine N. One input of the NOR gate 326 is inverted and is connected to the STATE MM signal, which indicates that the main memory state machine M is in state MM, the final state of the state machine. The other input to the NOR gate 326 is connected to the output of a 2 input NOR gate 328 whose inputs are the NOT STATE NC signal and the WT1* signal. These signals are both related to the next address memory state machine N and will be explained in more detail later, but indicate in this case that the QWM cycle is occurring and cause the single CLK2 signal cycle high state of the OBEN* signals at the beginning of the second dword fetch of a word cache fill.

The second input to the NOR gate 322 is the output of a 4 input NAND gate 330. Three of the inputs to the NAND gate 330 are the NOT STATE MG signal, the NOT NEXT STATE MH signal and the NOT STATE ND signal. The fourth input is the output of a 2 input NAND gate 332 whose inputs are the W-R signal and the STATE ME signal. The logic of NAND gates 330 and 332 is such that the OBEN* signals go low when appropriate and are disabled by the AND gate 324.

The D input of the latch 316 is connected to the output of a 3 input OR gate 334. The D input of latch 318 is connected to the output of a 3 input OR gate 336. One input to each of the OR gates 334 and 336 is the W-R signal. The other two inputs to the OR gate 334 are the output of a 3 input AND gate 338 and the output of a 2 input NOR gate 340. The inputs to the AND gate 338 are the HA<2> signal, the NOT STATE ND signal and the DM32 signal. Thus, if the cycle is not in the beginning phase of a QWM cache fill cycle and the main memory 34 is properly addressed, the HA<2> signal is passed to the OR gate 334. The output of the AND gate 338 is also provided to the D input of a latch 340. The enable input of the latch 340 is connected to the output of an OR gate 342 whose inputs are the STATE ME and STATE MH signals. Thus, whenever the main memory state machine M is in state ME or state MH, the output of the AND gate 338 is enabled into the latch 344. The noninverting output of the latch 344 is provided to one input of the NOR gate 340, whose other input is the NOT STATE ND signal.

Thus, by this arrangement, whenever the first portion of a QWM cache fill cycle is in operation, the HA<2> signals are effectively inverted so that the opposite OBEN* signal is enabled to drive the wrong 32 bit dword to the intermediate data bus HD.

The other 2 inputs of the OR gate 336 are connected to the output of a 3 input NAND gate 346 and the output of a 2 input NOR gate 348. The inputs to the AND gate 346 are the NOT STATE ND signal, the DM32 signal and the HA<2>* signal. The output of the AND gate 346 is also connected to the D input of a latch 350 whose enable signal is provided by the output of the OR gate 342. The noninverting output of latch 350 is provided as one input to the NOR gate 348, whose other input is the NOT STATE ND signal. Thus it can be seen that this is a symmetric operation so that whichever OBEN* signal has been enabled in the first half of a QWM cache fill cycle, the other one is automatically enabled in the second half. When QWM cache fill cycles are not occurring, the state of the HA<2> signal controls which of the OBEN* signals is enabled and which dword is being provided to the intermediate data bus HD. The timing of the actual presentation of the OBEN* signals is provided by the flip-flop 320 and the logic associated therewith.

The main memory state machine M proceeds from state MH to state MI in all cases. In state MI, the MWE* signal is lowered if a write cycle is in operation. The main memory state machine M stays in state MI for two CLK2 signal cycles, as indicated by the WAIT1* signal, at which time it proceeds to state MK, the alternate entry from state MG. If a write operation is occurring, the column address strobe signal is lowered upon entry to state MK. The main memory state machine M stays in state MK for two full CLK2 signal cycles as indicated by the WAIT1* signal, at which time it proceeds to state ML.

At state ML the MWE* signal is raised. The main memory state machine M stays in state ML if an I/O operation is in process and a HLDA cycle is occurring as indicated by the presence of the M-IO* signal and the DHLDA signal. Additionally, the main memory state machine M stays in state ML during the first portion of a QWM cycle cache fill operation, which is indicated by the RDYDIS signal being high, the W-R signal being low, the NAMGO* signal being high and the DHLDA signal being low. Thus, during non-hold cycles where the ready is disabled by the bus controller 100, which indicates that a cache fill is occurring and the next address memory state machine N has not entered the second cycle portion of the next address memory state machine N, the main memory state machine M stays in state ML to allow the transparent first portion of a cache fill cycle to occur. When the first portion of the cache fill is completed or no cache fill operation is needed as indicated by the RDYDIS signal being low, the W-R signal being high, or the NAMGO signal being high and the DHLDA* signal is low or if a non-I/O hold cycle is in process by indication that the M-IO signal is high and the DHLDA signal is high, control proceeds to state MM.

Upon entry to state MM the column address strobe is raised. There are two exits from state MM. The first exit is to state MD if the LDHLDA signal is high. The LDHLDA signal is a latched version of the DHLDA signal which is latched by a signal indicating entry into a state prior to the falling edge of the ADS signal because the DHLDA signal may be removed before certain branching decisions are made. If a hold cycle had not occurred, control proceeds from state MM to state MA.

In state MA the CBEN* and OBEN* signals are properly changed or driven. Control stays at state MA if the MEMMISS* signal is high and the DHLDA* signal is high. This is a condition that indicates that there has not been a paged memory miss and the HLDA signal is not present. The MEMMISS* signal is the output of a 4 input NAND gate 352 (FIG. 8). The 4 inputs to the NAND gate 352 are the DM32 signal, the M-IO signal, the HIT* signal and the G0M32 signal. The HIT* signal is a result of the address comparison between the present cycle and the previous cycle to determine if a hit is made within the memory page currently active in the memory devices. There are two exits from state MA. One transfer out of state MA is to state MH if a signal referred to as IHIT is true and the RADS signal is true. The IHIT signal is the output of a 4 input AND gate 354 (FIG. 8). The 4 inputs to the AND gate 354 are the DM32 signal, the M-IO signal, the HIT signal and the G0M32 signal. Thus, if a memory cycle is being addressed to the main memory and a page hit has occurred, the IHIT signal is true. Thus, if there is a page hit and the rising edge of the ADS signal has been received, control transfers to state MH, so that a short memory cycle can occur because no RAS precharge time is needed and the row address does not need to be changed. However, under page miss conditions the MEMMISS signal is true, or if a hold cycle is being commenced as indicated by the presence of the DHLDA signal, then control transfers from state MA to state MB.

In state MB the row address strobe signal is raised. In state MB a wait loop is started and control remains in state MB unless either two wait states have passed and a write operation is occurring or four wait states have passed. These wait states allow the RAS precharge time to be developed. Under either of those conditions control transfers to state MD to restart the cycle as has been described. Thus, the main memory state machine M of FIG. 4, when operated with the proper memory devices and at the desired speeds automatically handles the precharge timing and cycle timings of the memory devices based on page hit or miss operations or whether a HLDA cycle is occurring.

The next address memory state machine N of FIG. 5 is utilized in cooperation with the main memory state machine M of FIG. 4 to determine when the next address memory signal needs to be produced. There are two main loops in the next address memory state machine N, one being utilized for standard memory cycles and the other one being utilized for QWM and cache fill cycles. Operation of the next address memory state machine N starts at state NA where the NAM and NAMGO signals are raised. The NAM and NAMGO signals are produced by flip-flops 356 and 358, respectively (FIG. 7). The NAMGO signal is the inverting output of the flip-flop 358 while the NAMGO* signal is the noninverting output of flip-flop 358. The clocking signal of the flip-flop 358 is the CLK2 signal, while the D input is connected to the NOT STATE NA signal. Thus at times other than state NA the NAMGO signal is low. The NAMGO signal is used by the main memory state machine M to determine when to exit state ML. The NAM* signal is the inverting output of the flip-flop 356. The clocking signal to the flip-flop 356 is provided by the CLK2 signal while the D input is connected to the output of a 2 input OR gate 360. The 2 inputs to the OR gate 360 are the NEXT STATE NB and NEXT STATE ND signals. The noninverting output of the flip-flop 356, which is the NAM signal, is provided to the D input of a flip-flop 362 whose clock is provided by the CLK2 signal. The inverting output of flip-flop 362 is the MRDY* signal, which is an indication of when the memory is ready for operation.

The NOT STATE NA signal is also one input to a 2 input NAND gate 364 whose other input is the noninverting output of a flip-flop 366. The output of the NAND gate 364 is the D input to the flip-flop 366, whose clocking is the CLK2 signal. The reset input on the flip-flop 366 is the RST* signal. The noninverting output of the flip-flop 366 is the WT1*, while the inverting output of the WT1 signal. Thus, the flip-flop 366 provides a one CLK2 cycle wait signal so that the next address memory state machine N, which proceeds on the CLK2 edge, can be delayed to be a full CLK1 cycle when desired by utilizing the WT1 signal.

The NA state of the next address memory state machine N is the primary idle state where it spends most of its operation. The state machine loops in state NA and exits to state NB only under three conditions. The first condition is that the next state of the main memory state machine M is state MG, a write operation is occurring and the DHLDA* signal is true. The second condition is that the main memory state machine M is in state MI, a write operation is occurring, a page hit has occurred, and the DHLDA* signal is low. The third and final condition for transfer to state NB is that the main memory state machine M is in state MI, a read operation is occurring and the DHLDA* signal is low. Therefore, when no hold operations are occurring and the main memory state machine M is transferring from state ME to MG on write operations, is in state MI during a write operation and a page hit has occurred or is in state MI and a read operation has occurred, control transfers to state NB. Control remains in state NB and recycles to state NB while the WT1* signal is high. Thus, at the next full CLK1 signal cycle, control transfers to either state NA or to state NC depending upon whether a cache fill cycle needs to be performed. In state NB, the NAM signal is lowered and the NAMGO signal is lowered.

Control transfers to state NA if the RDYDIS* signal is high and the one wait state has been completed or if a write operation is occurring and the one wait state has completed. The RDYDIS* signal being high is an indication from the bus controller 100 that a QWM cycle is not to be performed because a cache fill is not necessary. If a QWM cycle is to be performed, as indicated by the RDYDIS signal being high, the one wait state has been completed by the indication that the WT1 signal is high and a read operation is occurring, control transfers to state NC. In state NC the NAM signal is raised and control remains in state NC for one wait state as indicated by the WT1* signal. After the one wait state, control transfers to state ND where it remains for one CLK1 signal cycle and where the NAM signal is lowered. After the one wait state has been completed, control returns to state NA for further looping as necessary.

The next address memory state machine N normally cycles in states NA and NB during conventional memory operations and only cycles through states NC and ND during QWM and cache fill cycles. The cycling through states NC and ND are utilized to provide the extension to state ML and to provide the extra next address signal pulse.

Thus, it can be seen that the memory interface 36 properly controls the memory operation to allow paged operation of the memory so that the proper precharge times are developed, depending upon whether hold cycles are occurring, page hits or page misses are developed and includes provisions for allowing the addresses present at the memory banks 102A and 102B to be properly held during QWM cycles to allow the second dword fill, that is the desired address fill, of the cache RAM 26 to be performed in a zero wait state operation by simply shifting the output controls of the transceivers 104A and 104B.

Figure 15:
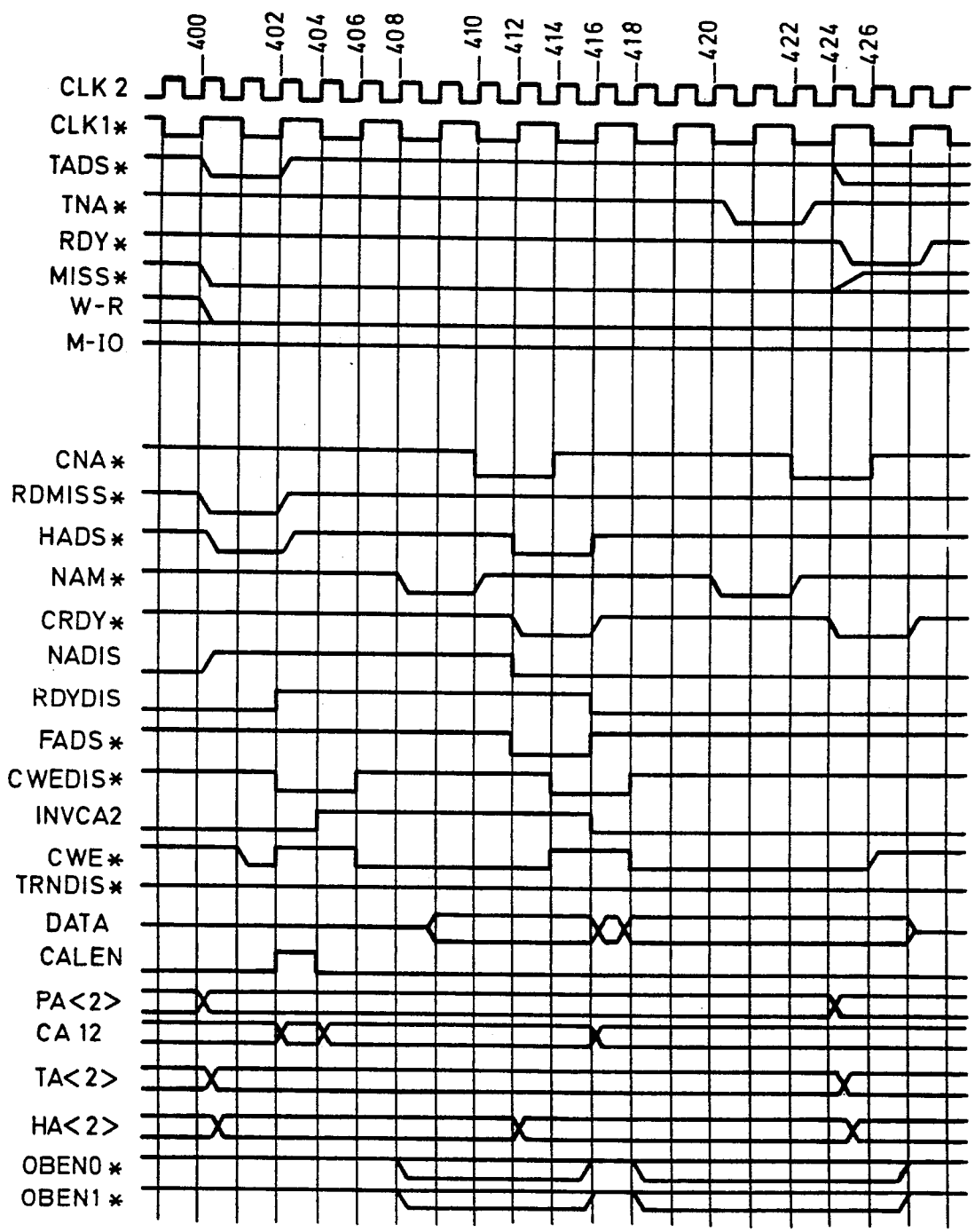
FIG. 15 is a timing diagram of various signals relating to the bus controller of FIG. 2.

FIG. 15 illustrates the timing of the various address status, next address and ready signals and the various address lines and disabling signals utilized to provide the qword fill of the cache memory 26 on read miss operations. At time 400, indicative of entering a T1 state, the cache controller 24 lowers the TADS* signal and the MISS* signal indicating that an address is present and that this is a cache miss operation. At this time the W-R signal is low indicating that it is a read operation and the M-IO signal is high indicating that it is a memory operation. Therefore, the four of these signals can be combined to indicate that a read miss has occurred as indicated by the RDMISS* signal. The RDMISS* signal is the output of a 5 input NAND gate 370 (FIG. 14). The 5 inputs are the MISS signal, the TADS signal, the W-R* signal, the M-IO signal and the TRAINDIS* signal. The first 4 signals indicate that a cache read miss has occurred and the fifth signal, the TRAINDIS* signal, indicates that the QWM logic in the bus controller 100, which is referred to as the train logic, has not been disabled and is active. Thus, under those conditions the RDMISS* signal goes low.

The HADS* signal is lowered at time 400 to reflect the lowering of the TADS* signal and the NADIS signal is raised. The HADS* signal is a signal used internally by the bus controller 100 to control the various devices located on the system buses. The TADS* signal and a signal referred to as the FADS* signal are combined by a 2 input AND gate 456 whose output is the HADS* signal. The FADS* signal will be explained in detail. The NADIS signal is raised at this time based on the fact that it is known to be a cache read miss and that a QWM cycle will thus be occurring. It is required because the undesired dword is fetched first, and the first next address signal must be suppressed from the cache controller 24 so that it does not think that the cycle is completed. By allowing the second next address signal to be passed to the cache controller 24, the cycle can complete as it normally would. Thus, the NADIS signal is used to suppress the first next address signal produced by the memory interface 36, that is the first pulse on the NAM* line.

At time 402, one CLK1 signal cycle later, the TADS* signal is raised, thus causing the RDMISS* signal to be raised and the HADS* signal to be raised. At this time the RDYDIS signal is raised to indicate that the next ready operation must also be blocked from the cache controller 24 and a signal referred to as CWEDIS* is lowered. The CWEDIS* signal is a signal which is used to force the write operations to occur on the memory devices forming the cache RAM 26 as previously described. The first lowering of the CWEDIS* signal is provided so that when the address to the cache RAM 26 is changed for writing of the undesired dword, a write operation is not occurring and so data is written into only guaranteed locations. While this timing results in unknown data being stored in the desired dword at this time, the proper data is stored in the desired dword at the completion of the full transfer cycle. At time 402, the cache controller 24 produces the CALEN pulse to latch in the addresses which are present on the local address bus PA. Thus the proper bit CA12 is normally provided to the cache RAM 26 due to the CA12 PAL 108 not being in an inverted phase.

At time 404, the next rising edge of the CLK2 signal, the INVCA2 signal, that is the invert address 2 signal, goes high to indicate that the wrong double word will be retrieved first and to force the bit 2 or bit 12 address, as appropriate, to the proper state. Because this is a long operation and will be a full memory fetch, the timing requirements for the address bit to the cache RAM 26 are not critical and thus the buffer control can be used as previously discussed. Thus, based on the INVCA2 signal changing, the CA12 signal applied to the cache RAM 26 changes. At time 406, the next rising edge of the CLK2 signal, the CWEDIS* signal is raised, thus allowing a write operation to be commenced to the cache RAM 26. At time 408, the next rising edge of the CLK2 signal, the NAM* signal is lowered by the memory interface 36 because in the cycle presented it is assumed that this is a page hit operation and thus the operation can be performed quickly. At time 410, the next rising edge of the CLK1 signal, a signal referred to as CNA* is lowered inside the bus controller 100. The CNA* signal is utilized for bus controller operations to indicate that the next address to the various memory devices or bus devices can be presented.

At time 412, the next rising edge of the CLK2 signal, the CRDY* signal is lowered by the bus controller based on the fact that the MRDY* signal has been received from the memory interface 36. At this time the bus controller lowers the NADIS signal to indicate that further next address signals need not be blocked and lowers the FADS* signal, that is, the forced address select signal. This forced address select is used to provide the additional address select signal needed because of the two operations being performed to the memory. This lowering of the FADS* signal causes the HADS* signal to be lowered for the same time as the FADS* signal. At time 414, the next rising edge of the CLK2 signal, the CWEDIS* signal is lowered, thus raising the effective CWE* applied to the memory chips. This forces the memory devices in the cache RAM 26 to store the data which was present at their data bus inputs at this time, thus completing the write operation for the undesired dword of the cache fill. At time 416, the next rising edge of the CLK2 signal, the FADS* signal is raised, the RDYDIS signal is lowered and the CRDY* signal is raised. Thus, the HADS* signal goes high, indicating the end of this address status strobe and the INVCA2 signal goes low, indicating that it is no longer necessary to flip the addresses to the cache controller.

At time 416, the OBEN* signals are made high by the memory interface 36 so that the data actually being delivered from the transceivers/parity units 104A and 104B can be switched. Also at time 416, the CA12 line to the cache memory is flipped because of the change in the INVCA2 state. At time 418, the next rising edge of the CLK2 signal, the CWEDIS* signal goes high so that the cache memory 26 can start storing the data because the effective CWE* signal is low. Also at this time, the OBEN* signal is made low and data begins appearing at the cache memory 26.

At time 420, the next rising edge of the CLK1 signal, the memory interface 36 provides the next NAM* pulse to indicate that the operation will be done. In the timing illustrated in FIG. 15, a two wait state second dword fill operation is occurring. While the memory timing diagrams (FIGS. 9, 10 and 11) indicate that zero wait state operation can occur, and this is indeed the normal condition in the preferred embodiment, the bus controller 100 is sufficiently generalized so that if the data must be obtained from devices on the system bus, the length of cycle appropriate for the responding device is utilized. In this case, this is shown by the two wait state operation of FIG. 15.

This second lowering of the NAM* signal is presented to the cache controller 24 by the lowering of the TNA* signal, which thus indicates to the cache controller 24 that the cache fill operation is completing. Thus, one next address or data read operation has been hidden from the cache controller 24. At time 422, the next rising edge of the CLK1 signal, the NAM* signal is removed and the CNA* signal goes low indicating to the bus controller that the next address has been presented and properly synchronized. At time 424, the next rising edge of the CLK2 signal, the cache controller 24 may assert the TADS* signal low to commence the next cycle and the RDY* signal is raised to the cache controller 24 to indicate that the data is ready. This RDY* assertion is based on the fact that the CRDY* signal has been lowered by the bus controller 100 based on the presentation of the MRDY* signal from the memory interface 36. The main portion of the cycle completes as it normally would, being controlled by the cache controller 24. Thus, at time 426, the next rising edge of the CLK2 signal, the CWE* signal which is effectively presented to the memory devices is raised because the cache controller 24 has raised the appropriate CWEA* or CWEB* signal.

Figure 12:
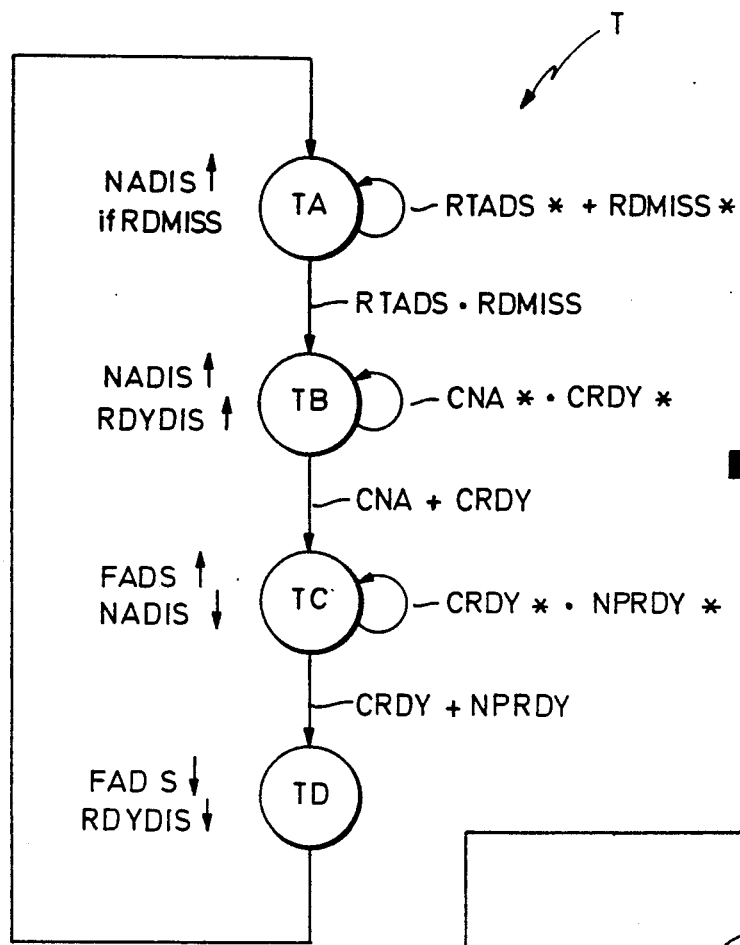
FIGS. 12 and 13 are state machine diagrams of portions of the bus controller of FIG. 2.

Two state machines and various logic gates are used by the bus controller 100 to perform these enabling, disabling, and timing operations. The train state machine T of FIG. 12 is used to control the presentation of the NADIS and RDYDIS signals to the memory interface 36, the RDY PAL 106 and the HA2 PAL 110. The train state machine T is clocked on the CLK1 signal. The train state machine T starts at state TA. The train state machine T loops at state TA while the RTADS* signal is high or the RDMISS* signal is high. The RDMISS* signal has been previously defined and it indicates a cache miss operation has not occurred. The RTADS signal is the output of a 2 input AND gate 372 (FIG. 14). One input to the AND gate 372 is inverted and is connected to the TADS* signal. The other input to the AND gate 372 is connected to the output of a NAND gate 374 whose two inputs are the CRDY* signal and the INPROG signal. Thus, the presence of the RTADS signal is an indication that this is the rising edge of the TADS signal, either because a cycle is not in progress or because the previous cycle is ending. When the rising edge of the TADS* signal has been received and a cache miss has been determined to have developed based on the state of the RDMISS* signal, control proceeds to state TB.

The NADIS signal is raised when the RDMISS signal goes high and the train state machine T is in state TA or upon entry to state TB, whichever occurs first. The NADIS signal is produced as the output of an OR gate 376 whose inputs are the STATE TB signal and the output of a 2 input AND gate 378. The 2 inputs to the AND gate 378 are the RDMISS signal and a signal indicating that the train state machine T is in state TA. Also upon entry to state TB, the RDYDIS signal is raised. The RDYDIS signal is the output of an OR gate 380 whose two inputs are indications that the train state machine T is in state TB or state TC. The train state machine T loops at state TB while the CNA* signal is high and the CRDY* signal is high. The CNA* signal is a synchronized version of the NAMS* signal which is synchronized by the CLK1 signal. The CNA* signal is the inverting output of a flip-flop 382 (FIG. 14). The clocking signal to the flip-flop 382 is the CLK1 signal, while the flip-flop 382 has an inverting D input which is connected to the NAM* signal. The train state machine T thus stays in state TB until either a CRDY signal is received or the next address signal is received from the memory interface 36.

At that time, that is when the CNA signal is true or the CRDY signal is true, control proceeds to state TC. By entry to state TC, the FADS signal is raised and the NADIS signal is lowered. The FADS signal is the output of a buffer 384 which has an input of a signal indicating that the train state machine T is in state TC. The train state machine T stays in state TC while the CRDY* signal is high and a signal referred to as NPRDY* is high. The NPRDY* signal is provided by the inverting output of a flip-flop 386. The clocking signal to the flip-flop 386 is provided by the output of the NAND gate 294. The reset or clear input to the flip-flop 386 is connected to the RST* signal. The D input to flip-flop 386 is connected to the output of a 2 input AND gate 388 whose inputs are the CRDY signal and a STATE TB signal which indicates that the train state machine T is in state TB. The NPRDY* signal is the non-pipelined ready signal and is used when a ready signal appears before a next address signal.

If the CRDY signal is high or the NPRDY signal goes high, control proceeds to state TD at which time the FADS signal is lowered and the RDYDIS signal is lowered. This is an indication that the train state machine is exiting the logic to provide the extra cycles or disabling of various signals necessary to perform the extra memory operation needed to perform the 64 bit cache fill. Control proceeds from state TD to state TA.

The various states of the train state machine T are utilized with various other logic elements and flip-flops to indicate when the first word and the second word of the qword operation are being developed so that the INVCA2 signal can be developed. A flip-flop 390 has as its inverting output the CWD1* signal and has as its noninverting output the CWD1 signal. The flip-flop 390 is clocked by the output of NAND gate 294 and has its D input connected to the output of a 3 input NAND gate 392. The three inputs to the NAND gate 392 are the RTADS signal, the RDMISS signal, and a signal indicating that the train state machine T is in state TA. Thus, this signal is an indication that the first dword of the cache dword fill is being obtained. A flip-flop 394 has as its noninverting output the CWD2 signal. This flip-flop 394 is clocked by the output of NAND gate 294 and has its inverting D input connected to the output of a 2 input NAND gate 396. One input of the NAND gate 396 is connected to the CRDY signal while the other input is connected to the output of a 2 input OR gate 398. The two inputs to the OR gate 398 are STATE TB and TC signals to indicate that the train state machine T is in states TB or TC. Thus, the output of the flip-flop 394 is an indication that the second dword of the cache fill is being obtained.

The CWD1* and CWD2 signals are utilized to develop the INVCA2 signal. A flip-flop 450 has as its noninverting output the INVCA2 signal. The clocking input to the flip-flop 450 is the CLK2 signal and the reset input is connected to the RST* signal. The D input to flip-flop 450 is connected to the output of a 2 input OR gate 452. One of the inputs to the OR gate 452 is inverted and is connected to the CWD1* signal. The other input of the OR gate 452 is connected to the output of a 2 input NOR gate 454. The two inputs to the NOR gate 454 are the CWD2 signal and the inverting output of the flip-flop 450. Thus the INVCA2 signal is high during the first dword transfer and until the second dword transfer starts.

The CWD1 and CWD2 signals are used to develop the CWEDIS* signal. A two input NOR gate 397 has the CWD1 and CWD2 signals as inputs and develops the CWEDIS* signal as the output.

The cache controller 24 receives the TNA* signal to indicate that the next address can be presented. The TNA* signal is presented by the output of a 2 input NAND gate 458. One of the inputs of the NAND gate 458 is inverted and is connected to the NADIS signal. The other input of the NAND gate 458 is connected to the output of a 2 input NAND gate 460, one of whose inputs is the NAM* signal. The other input to the NAND gate 460 is the inverting output of a flip-flop 462. The clocking signal to the flip-flop 462 is the CLK1 signal. The D input to the flip-flop 462 is inverted and has connected to it the NAB* signal. The NAB* signal is produced by the bus controller 100 and is an indication that the cycle which is being performed on the system by the bus controller 100 is ready for the next address to be presented. Thus, the output of the NAND gate 460 is an indication that the next address can be presented by the cache controller 24. This signal is disabled in the case of the first dword access in a qword cache fill operation.

Thus, the bus controller 100 provides the remaining necessary logic to allow the appropriate signals to be properly generated for presentation to the memory devices or blocked from the cache controller 24 so that the first 32 bit retrieval operation to fill the cache is transparent and completely hidden from the cache controller 24.

Figure 13:
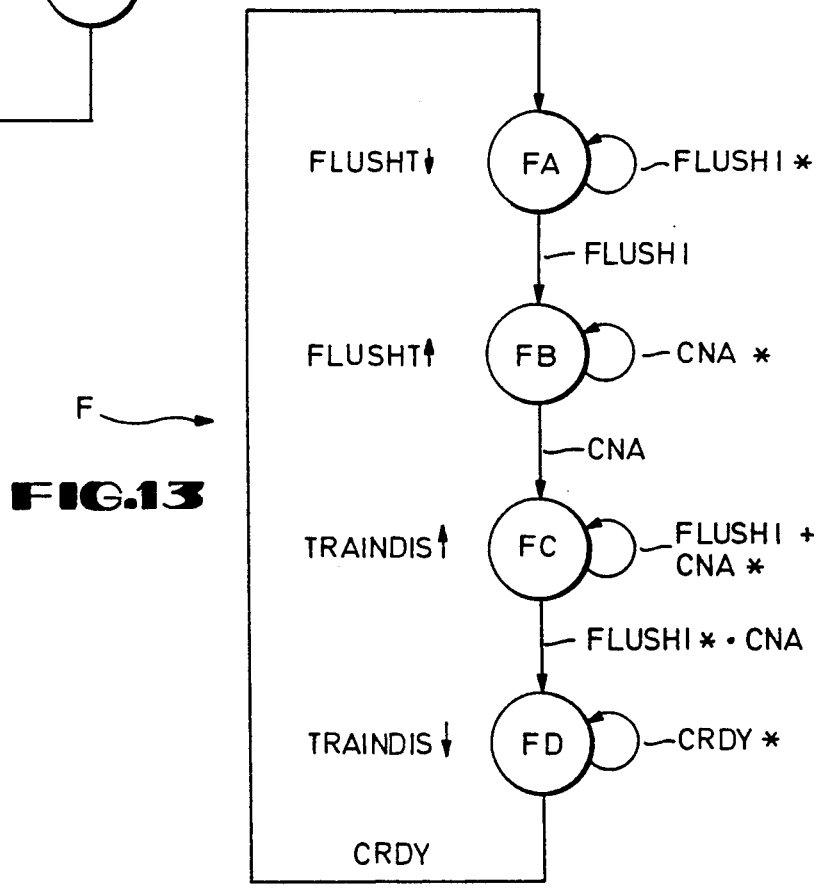

It is also desirable that the train logic and qword logic be disabled when the cache system is turned off or disabled. Conventionally, the cache controller 24 is disabled by driving the flush input to a flush condition and holding it at that state. This creates a problem if the qword cache fill logic is enabled. If the qword cache fill logic were to be enabled, the cache controller 24 would be indicating that a read miss operation has occurred at each read operation because all of the tag values in the cache controller 24 would be empty. However, when the cache controller 24 is disabled, there is no reason to perform the cache fill operations and therefore the qword cache fill logic should be disabled. This disabling operation is performed by the flush state machine F of FIG. 13, which is clocked by the output of NAND gate 294.

The flush state machine F starts operation in state FA where the FLUSHT signal is lowered. This lowering is accomplished by having the FLUSHT* signal developed by the output of an inverter 464 (FIG. 14). The input to the inverter 464 is a signal indicating that the flush state machine F is in state FA. The flush state machine F stays in state FA while a signal referred to as FLUSHI is low. The FLUSHI signal is a signal which is received from the processor 20 which indicates that the cache controller 24 is to be disabled. As long as this signal is in a low state, the cache is operational and any read miss operations are filled using the qword cache fill logic. If the FLUSHI signal should go high, control proceeds on the next rising edge of the signal produced by NAND gate 294 to state FB, where the FLUSHT signal is raised. The flush state machine F stays in state FB while the CNA signal is low, so that a smooth transfer to the disabled state can be made without causing interference with the addressing logic. When the CNA signal goes high, the flush state machine F progresses to state FC, where the TRAINDIS signal is raised. The flush state machine F stays in state FC while the FLUSHI signal is high or while the CNA* signal is high. The FLUSHI signal term is generally used so that the flush state machine F stays in this state while the cache system is disabled. The CNA* signal is used so that a smooth exit from state FC can be accomplished based on synchronization with the machine cycle. Thus, when the FLUSHI signal is low and the CNA signal is high, the flush state machine F proceeds to state FD, where the TRAINDIS signal is lowered. The flush state machine F stays in state FD while the CRDY signal is low. When the CRDY signal goes high, control proceeds to state FA. Thus, the flush state machine F allows the train logic to be smoothly enabled and disabled without adversely affecting operation of the computer C.

Thus the present invention allows the use of paged memory and a 64 kbyte cache with the 82385. Because cache fill operations are performed in zero wait states even though the data is provided over a dword wide data bus, overall system performance is not decreased and yet the more desirable 32 bit data bus can be used.

The foregoing disclosure and description of the invention are illustrative and explanatory thereof, and various changes in the size, shape, materials, components, circuitry, wiring connections and contacts, as well as in the details of the illustrated circuitry and construction and method of operation may be made without departing from the spirit of the invention.

I claim:

1. A computer system, comprising:
  a processor organized to transfer data n bits wide and providing m bits of addressing;
  a first address bus having a plurality of address lines coupled to said processor to allow transfer of address values;
  a first data bus coupled to said processor to allow transfer of data values;
  cache memory coupled to said first address bus and said first data bus and organized as n bits wide;
  a second address bus having a plurality of address lines to allow transfer of address values;
  means coupled to said first and second address buses to allow transfer of address values from said first address bus to said second address bus;
  a cache memory controller designed to determine whether a read miss has occurred wherein said cache memory controller utilizes an n bit line size and expects a single data transfer cycle n bits wide on a read miss line fill, wherein said cache memory controller is coupled to said cache memory, to said address lines of said first address bus to produce a 2n bit line size, and to said first address bus to second address bus transfer means, wherein said cache memory controller includes next address and ready to complete data transfer inputs, so that said cache memory controller controls the transfer of address values from said first address bus to said second address bus based on values of said next address and said ready to complete data transfer inputs to produce a single data transfer cycle on a read miss line fill;

main memory coupled to said second address bus and organized as 2n bits wide;

a second data bus, said second data bus being n bits wide;

means coupled to said main memory and said second data bus for providing a selected n bits of said 2n bits of said main memory to said second data bus; and read miss transfer control means for controlling the transfer of said 2n bits of data from said main memory to said cache memory after said cache memory controller determines that a read miss has occurred and causing each of said selected n bits to be written to said cache memory, said read miss transfer control means being coupled to said cache memory controller, to said cache memory and to said means for providing selected n bits to said second data bus.

2. The computer system of claim 1, further comprising:

other than read miss transfer control means coupled to said cache memory controller and to said means for providing selected n bits to said second data bus for controlling the transfer of data between said main memory and said cache memory at times other than after a read miss.

3. The computer system of claim 2, further comprising:

means coupled to said next address input of said cache controller, said read miss transfer control means and said other than read miss transfer control means for indicating to said cache controller, said read miss transfer control means and said other than read miss transfer control means when the next address can be presented to said main memory for all memory cycles.

4. The computer system of claim 2, further comprising means coupled to said ready to complete data transfer input of said cache controller, said read miss transfer control means and said other than read miss transfer control means for indicating to said cache controller, said read miss controlling means and said other than read miss transfer control means that said main memory is ready to complete the data transfer cycle for all memory cycles.

5. The computer system of claim 4, further comprising means coupled to said next address input of said cache controller, said read miss transfer control means and said other than read miss transfer control means for indicating to said cache controller, said read miss transfer control means and said other than read miss transfer control means when the next address can be presented to said main memory for all memory cycles.

6. The computer system of claim 5, wherein said cache memory controller is coupled to said read miss transfer control means and said other than read miss transfer control means and responds with the next address based on said next address and ready indications, and wherein said read miss transfer control means includes means coupled to said next address means and said ready means for preventing transfer of said next address and ready indication to said cache memory controller on the transfer of the first n bits of data to said cache memory.

7. The computer system of claim 1, further comprising:

means coupled to said processor for disabling said cache memory controller on command from said processor; and means for disabling said read miss transfer control means responsive to said cache memory controller being disabled.

8. The computer system of claim 1, wherein said main memory includes page mode memory devices for data storage.

9. The computer system of claim 8, wherein said read miss transfer control means operates said page mode memory devices in page mode.

10. The computer system of claim 1, wherein said read miss transfer control means includes means for holding address information provided from said cache memory controller to said main memory valid while said 2n bits of data are being transferred from said main memory to said cache memory.

11. The computer system of claim 1, wherein said read miss controlling means includes means for selecting the proper n bits of said cache memory of said 2n bits recognized by said cache memory controller.

12. The computer system of claim 1, wherein n is 32.

13. The computer system of claim 1, wherein the transfer of said first n bits occurs in a first time and the transfer of said second n bits occurs in a second time, said second time being less than said first time.

14. The computer system of claim 13, wherein said second time is equal to the zero wait state access time of said processor.

* * * * *

UNITED STATES PATENT AND TRADEMARK OFFICE
CERTIFICATE OF CORRECTION

PATENT NO. : 5,253,358
DATED : October 12, 1993
INVENTOR(S) : Roy E. Thoma, III, et al.

It is certified that error appears in the above-identified patent and that said Letters Patent is hereby corrected as shown below:

In col. 24, line 20, please delete "indication" and replace with --indications--.

Signed and Sealed this

Fifth Day of April, 1994

Attest:

BRUCE LEHMAN

Attesting Officer

Commissioner of Patents and Trademarks